(12) United States Patent
Matsumura et al.

(10) Patent No.: US 6,916,507 B2
(45) Date of Patent: Jul. 12, 2005

(54) AQUEOUS WATER REPELLENT FOR SUBSTRATE TREATMENT, MAKING METHOD, PREPARATION OF MODIFIED PLYWOOD OR MODIFIED LAMINATED VENEER LUMBER, AND PREPARATION OF WOODEN FIBERBOARD

(75) Inventors: Kazuyuki Matsumura, Usui-gun (JP); Akira Yamamoto, Osaka (JP); Hisayoshi Suda, Osaka (JP); Kenichi Kadota, Osaka (JP)

(73) Assignees: Shin-Etsu Chemical Co., Ltd., Tokyo (JP); Sumitomo Forestry Co., Ltd., Osaka (JP)

( * ) Notice: Subject to any disclaimer, the term of this patent is extended or adjusted under 35 U.S.C. 154(b) by 45 days.

(21) Appl. No.: 10/465,680

(22) Filed: Jun. 20, 2003

(65) Prior Publication Data

US 2004/0113117 A1 Jun. 17, 2004

Related U.S. Application Data

(63) Continuation-in-part of application No. PCT/JP02/01560, filed on Feb. 21, 2002.

(30) Foreign Application Priority Data

Feb. 22, 2001 (JP) ........................................ 2001-046573
Dec. 19, 2001 (JP) ........................................ 2001-385932

(51) Int. Cl.$^7$ .......................... B05D 1/18; B32B 21/00; B32B 21/14; B32B 27/04; C08L 83/04
(52) U.S. Cl. ...................... 427/440; 427/212; 427/439; 524/863; 524/864; 528/12; 528/34; 528/38; 106/287.11; 106/287.13; 106/287.16; 428/447; 428/452; 428/537.1
(58) Field of Search .............................. 528/10, 12, 33, 528/34, 35, 38; 524/858, 860, 863, 864, 869; 106/287.1, 287.11, 287.12, 287.13, 287.16; 428/446, 447, 452, 537.1; 427/212, 402, 407.1, 408, 439, 440

(56) References Cited

U.S. PATENT DOCUMENTS

| | | | |
|---|---|---|---|
| 5,226,954 A | | 7/1993 | Suzuki |
| 5,661,196 A | | 8/1997 | Mayer et al. |
| 5,985,372 A | * | 11/1999 | Saka et al. .................. 427/387 |
| 6,077,966 A | * | 6/2000 | Matsumura et al. ........ 556/425 |
| 6,287,701 B1 | * | 9/2001 | Oochi et al. ................ 428/447 |
| 2003/0213400 A1 | * | 11/2003 | Thompson ............... 106/15.05 |

FOREIGN PATENT DOCUMENTS

| | | |
|---|---|---|
| JP | 55-133466 A | 10/1980 |
| JP | 55-133467 A | 10/1980 |
| JP | 61-162553 A | 7/1986 |
| JP | 1-292089 A | 11/1989 |
| JP | 4-249588 A | 9/1992 |
| JP | 5-156164 A | 6/1993 |
| JP | 5-221748 A | 8/1993 |
| JP | 5-237813 A | 9/1993 |
| JP | 7-150131 A | 6/1995 |
| JP | 9-59116 A | 3/1997 |
| JP | 9-77780 A | 3/1997 |
| JP | 10-81752 A | 3/1998 |
| JP | 11-165303 A | 6/1999 |
| JP | 11-178463 A | 7/1999 |
| JP | 11-226918 A | 8/1999 |
| JP | 11-322945 A | 11/1999 |
| JP | 2000-95868 A | 4/2000 |
| JP | 2001-260104 A | 9/2001 |

* cited by examiner

*Primary Examiner*—Michael J. Feely
(74) *Attorney, Agent, or Firm*—Birch, Stewart, Kolasch & Birch, LLP

(57) ABSTRACT

An aqueous water repellent useful in the treatment of substrates of lignocellulose-origin materials or the like is characterized by comprising the product of co-hydrolytic condensation of (A) 100 parts by weight of an organosilicon compound having the formula:

$$(R^1)_a(OR^2)_b SiO_{(4-a-b)/2} \tag{1}$$

wherein $R^1$ is alkyl, $R^2$ is alkyl, $0.75 \leq a \leq 1.5$, $0.2 \leq b \leq 3$ and $0.9 < a+b \leq 4$, and (B) 0.5–49 parts by weight of an amino-containing alkoxysilane having the formula:

$$R^3 R^4 NR^5-SiR^6{}_n(OR^2)_{3-n} \tag{2}$$

wherein $R^3$ and $R^4$ are H or alkyl or aminoalkyl, $R^5$ is a divalent hydrocarbon group, $R^6$ is alkyl, and n is 0 or 1, or a partial hydrolyzate thereof in the presence of an organic acid or inorganic acid.

21 Claims, 8 Drawing Sheets

AQUEOUS WATER REPELLENT FOR SUBSTRATE TREATMENT, MAKING METHOD, PREPARATION OF MODIFIED PLYWOOD OR MODIFIED LAMINATED VENEER LUMBER, AND PREPARATION OF WOODEN FIBERBOARD

CROSS-REFERENCE TO RELATED APPLICATIONS

This application is a continuation-in-part of PCT International Application No. PCT/JP02/01560, filed on Feb. 21, 2002, published as WO 2002/68558 on Sep. 6, 2202, and on which priority is claimed under 35 USC 120, the entire contents of which are hereby incorporated by reference.

TECHNICAL FIELD

This invention relates to an aqueous water repellent useful for the treatment of substrates such as paper, fibers, brick and materials originating from lignocellulose such as wood for the purposes of preventing paper from dimensional changes by water or ink and improving print properties, or imparting water repellency to fibers and materials originating from lignocellulose such as wood, and a method for preparing the same. It also relates to a method for preparing a plywood or a laminated veneer lumber and a method for preparing a wooden fiberboard.

BACKGROUND ART

In the prior art, many methods are known for imparting dimensional stability and water repellency to substrates, for example, paper items, fibrous items and building materials such as wood and brick. Typically, materials are coated or impregnated with solutions of silicone, acrylic, urethane, ester, fatty and oily resins or monomers, followed by drying. Of these repellents, silicone repellents are wide spread. In particular, silicone water repellents of the solvent dilution type become the main stream.

However, water repellents of the solvent dilution type generally have a more negative influence of the solvent on the environment than the water dilution type. Also from the standpoints of environmental protection and resource preservation, there is a strong desire to have water repellents which do not use solvents, especially aqueous water repellents of high performance.

While many aqueous water repellents were recently developed, JP-A 1-292089, JP-A 5-156164 and JP-A 5-221748 disclose long term stable emulsions having alkyltrialkoxysilanes emulsified in water. However, these emulsions have several drawbacks since they use alkoxysilanes characterized by very slow hydrolytic reaction. When the emulsion is applied to a material, the material is effectively impregnated therewith, but the silane volatilizes off from the material surface. As a result, the material surface loses water repellency, becomes vulnerable to water wetting, staining and popup by frosting and thus undesirably less durable, and looks milky white on outer appearance.

Aside from the emulsion type mentioned above, JP-A 61-162553, JP-A 4-249588 and JP-A 10-81752 disclose water repellents of homogeneous aqueous solution type.

However, the composition of JP-A 61-162553 lacks storage stability in that rapid polymerization reaction takes place upon dilution with water. The composition must be used within a day after dilution and is thus impractical. The rapid polymerization reaction leads to a molecular weight build-up, which retards impregnation of the material therewith, sometimes leaving wet marks on the material surface.

The composition of JP-A 4-249588 comprising a water-soluble amino group-containing coupling agent and an alkyltrialkoxysilane having a short carbon chain has good storage stability, but poor water repellency probably because only the lower alkyl group contributes to water repellency. Since the amino group-containing coupling agent component is included in excess of the alkylalkoxysilane component as demonstrated by a molar ratio of alkylalkoxysilane component/amino group-containing coupling agent in the range from 0.5/10 to 3/1, there are problems that wet color marks are left on the material surface and paper, fibrous items and wood are substantially yellowed.

JP-A 2000-95868 discloses a method for preparing a composition by first partially hydrolyzing an alkyltrialkoxysilane or alkyldialkoxysilane having a short carbon chain and an amino group-containing alkoxysilane, adding hydrolytic water and an acid to effect further hydrolysis, and finally adding a neutralizing agent. This method is complex. In the first step of effecting hydrolytic reaction on a mixture of the alkylalkoxysilane and the amino group-containing alkoxysilane, the amino group-containing alkoxysilane generally has a higher hydrolytic rate than the alkylalkoxysilane, which becomes a bar against co-hydrolysis, failing to effectively form a co-hydrolytic product. The composition finally obtained by this method is thus unsatisfactory. Treatment of neutral substrates with the composition undesirably imparts poor water repellency.

JP-A 7-150131 discloses the treatment of wood with a composition comprising a salt of an organic or inorganic acid with a basic nitrogen-containing organopolysiloxane, a water repellent substance and water. This composition, however, has the problems of insufficient water repellency and storage instability.

JP-A 55-133466 and JP-A 55-133467 disclose a composition obtained by hydrolyzing an alkylalkoxysilane, an amino group-containing alkoxysilane, an epoxy group-containing alkoxysilane and a metal-metalloid salt with water. The treatment of substrates with the composition minimizes yellowing. However, since amino groups are blocked by the reaction of amino groups with epoxy groups, the composition becomes so difficultly soluble in water that it cannot be used as an aqueous treating agent. The amino blocking also restrains the adsorption of the composition to substrates so that the composition cannot be used for the treatment of substrates.

To solve the above problems, we proposed in JP-A 9-77780 a composition comprising the co-hydrolyzate of an alkylalkoxysilane having 7 to 18 carbon atoms, an alkoxy group-containing siloxane and an amino group-containing alkoxysilane. Despite the use of long chain alkyl silane, the composition provides substrates with weak water repellency. When paper, fibrous items and wood are treated with the composition, somewhat noticeable yellowing occurs.

Proposed in JP-A 10-81752 is a binder composition which is stable in an alkaline region. Due to a substantial amount of amino group-containing alkoxysilane used therein, this composition had many problems including insufficient water repellency as an agent for treating non-alkaline substrates, wet color left on the treated material, and substantial yellowing.

Accordingly, all the water repellents described above are seldom regarded as performing satisfactorily for the treatment of substrates, especially neutral (weakly acidic to weakly alkaline) substrates.

On the other hand, housing members available at present include plywood members which are often used as bearing wall members, structural floor sheathing members, and roof sheathing members, and laminated veneer lumber which are often used as two-by-four members and Japanese traditional wooden framework members.

It has heretofore been possible to produce plywood and laminated veneer lumber from a useful wood raw material having excellent properties which is selected for a particular purpose or application from among wood raw materials having relatively good properties, for example, tropical timber. Due to the depletion of wood resources, it is not always possible under the currently prevailing circumstances to use only a wood raw material having excellent properties. Now that the regulation of insuring and promoting the quality of houses and buildings has been enforced, the quality demand to housing members is and will be increasing. It is forecasted that the future need is to produce plywood or laminated veneer lumber which are less expensive, have good physical properties and impose a less load to the environment upon discarding.

These facts suggest that with the progress of depletion of wood resources, the preparation of wooden panels from a wood material having excellent properties as the raw material is not always possible. In particular, plywood and laminated veneer lumber products from a typical forested tree, Radiate pine (Pinus Radiata D. DON) as the raw material have not been widespread because of problems including dimensional changes, warping and mildewing due to their high water and moisture absorptive properties.

One conventional approach use to solve these problems is to apply emulsions of acrylic water repellents or paraffinic water repellents. However, a blocking problem often occurs when these water repellents are applied to plies and dried and the plies are piled up. This problem precludes widespread use in practical applications.

For the preparation of wooden fiberboards, wet and dry methods are known in the art. In either method, sheet-shaped articles of wooden fibers obtained by paper machining or sheeting are generally heat compression molded by means of a hot press or similar equipment. The heat compression molded fiberboards, immediately after exiting from the hot press, are cooled and piled up in a cooling equipment of the elevator or wicket type.

In the method of preparing such fiberboards, it is common to use adhesives comprising formaldehyde-containing resins such as urea-formaldehyde resins, melamine-formaldehyde resins, and phenol-formaldehyde resins, alone or in admixture. At the same time, various waxes are used in the adhesives to impart water resistance to the fiberboards, for example, so-called synthetic waxes such as acrylic waxes, polyethylene waxes synthesized from polyethylene having a low degree of polymerization or acid modified products thereof, Fischer-Tropsch wax synthesized from carbon monoxide and hydrogen, and amide waxes synthesized from various fatty acids and ammonia or amine; petroleum base waxes such as paraffin wax and microcrystalline wax, and mineral waxes such as montan wax, ozokerite and ceresine.

Also, since the wooden fiberboards are molded under pressure, they experience substantial dimensional changes due to absorption and release of moisture or water after the molding. When they were actually used in houses, problems frequently occurred. Then studies have been made to improve the water resistance of wooden fiberboards for the purpose of improving the dimensional stability of wooden fiberboards. Besides the above-mentioned exemplary solution of wax addition, it has also been proposed to use isocyanate base adhesives having high water resistance, to carry out heat or steam treatment at high temperature (150 to 200° C.), and to carry out chemical treatment such as formalization.

However, the use of the above-mentioned waxes as means for improving the water resistance of wooden fiberboards generally tends to compromise the strength performance of fiberboards such as bending strength and internal bond strength. The use of isocyanate base adhesives has been under study and actual use as mentioned above, although these adhesives are very expensive as compared with urea-formaldehyde base resins and melamine-formaldehyde base resins, and so toxic that meticulous handling and strict management are required on their use as well as the new addition or modification of a safety security step.

Among the water resistance-ameliorating measures, the use of isocyanate base adhesives having high water resistance has the problems of expensiveness and meticulous handling and strict management on their use as described just above; and the heat treatment at high temperature (150 to 200° C.) has the drawback of an increased cost required to provide the high temperature and further raises the problem of requiring an extra step of increasing the water content of fiberboards, which has been once decreased to nearly absolute dryness during the treatment, to a water content (5 to 13%) which is acceptable on practical use. The steam treatment has the problems that the processing equipment is costly, and the running cost is very high. The chemical treatment such as formalization is very costly in itself and in the case of formalization, the increased amount of formaldehyde released is a problem.

Further, a method involving applying a surface modifier to a sheet-shaped member of wood fibers as by spraying, followed by heat compression molding, as disclosed in JP-A 2001-260104, has the problem that since excessive portions are cut away in finishing the member into a product, water can penetrate into the member through end faces so that member is readily swollen.

As discussed above, the prior art methods of improving water resistance have problems on practical usage in that reagents such as waxes are cost effective, but induce a decline of the strength performance of wooden fiberboards, the above-described adhesives, heat treatment, steam treatment and chemical treatment are effective for improving water resistance, but invite cost increases; that is, any of these measures fails to satisfy both of these requirements.

An object of the invention, which has been made in consideration of the above-mentioned circumstances, is to provide an aqueous water repellent for the treatment of substrates of materials originating from lignocellulose or the like which is improved in impregnation of the substrates therewith and imparts dimensional stability and water repellency to the treated substrates, and a method for preparing the same.

Another object of the invention is to provide a method for preparing modified plywood or modified laminated veneer lumber, which method can render plywood or laminated veneer lumber termite-proof, rot-proof, mildew-proof, water resistant, moisture resistant and dimensional stable and thus accomplish the desired performance without detracting from the lightweight advantage thereof.

A further object of the invention is to provide a method for preparing wooden fiberboards, in which wooden fiberboards endowed with water resistance, durability and strength performance can produced at a high productivity and low cost.

SUMMARY OF THE INVENTION

Making extensive efforts to accomplish the above objects, the inventors have discovered that when a product is obtained by effecting co-hydrolytic condensation in the presence of an organic acid or inorganic acid of (A) 100 parts by weight of an organosilicon compound having the following general formula (1):

$$(R^1)_a(OR^2)_b SiO_{(4-a-b)/2} \qquad (1)$$

wherein $R^1$ is an alkyl group having 1 to 6 carbon atoms, $R^2$ is an alkyl group having 1 to 4 carbon atoms, letter a is a positive number of 0.75 to 1.5, b is a positive number of 0.2 to 3 and a+b is from more than 0.9 to 4, and (B) 0.5 to 49 parts by weight of an amino group-containing alkoxysilane having the following general formula (2):

$$R^3R^4NR^5—SiR^6_n(OR^2)_{3-n} \qquad (2)$$

wherein $R^2$ is as defined above, $R^3$ and $R^4$ each are independently hydrogen or an alkyl or aminoalkyl group having 1 to 15 carbon atoms, $R^5$ is a divalent hydrocarbon group having 1 to 18 carbon atoms, $R^6$ is an alkyl group having 1 to 4 carbon atoms, and n is 0 or 1, or a partial hydrolyzate thereof, and especially the organosilicon compound is made alcohol-free by removing an alcohol from the reaction system, surprisingly, the co-hydrolytic condensation product itself is soluble in water and remains uniform upon dissolution in water, can be used simply after dilution with water, and maintains good storage stability even after water dilution, although the amount of the amino group-containing alkoxysilane component is small relative to the short chain alkyltrialkoxysilane or alkoxy group-containing siloxane. The co-hydrolytic condensation product is effective in penetrating into substrates for thereby imparting durable water repellency and dimensional stability to the substrates. When organic materials such as paper, fibrous items and wood are treated with the co-hydrolytic condensation product, yellowing is minimized due to the reduced content of the amino group-containing alkoxysilane component. Since the long chain alkylsilane component which was necessary in the prior art to impart water repellency is eliminated, the cost of the silane component is reduced, leading to an economic advantage. In summary, the co-hydrolytic condensation product is improved in impregnation of substrates therewith, effective for imparting dimensional stability, water repellency and durable water repellency to the substrates, and available at a low cost.

Also, making extensive investigations to develop a method for preparing improved plywood or laminated veneer lumber from a wood raw material not fully satisfying the required properties, the inventors have also discovered a method for preparing a modified wooden panel having improved termite-proof, rot-proof, mildew-proof properties, water resistance, moisture resistance and dimensional stability, by impregnating plywood or laminated veneer lumber with the above-described aqueous water repellent over regions extending from its front and back surfaces to a first adhesive layer, that is, typically from its front and back surfaces to a depth of 0.5 to 10 mm in a face and back veneer thickness direction, and effecting hydrolytic polycondensation for creating and securing to inner surfaces of inter- and intracellular spaces in wood an inorganic-organic composite substance based on silicon oxide ($SiO_2$) giving a minimal load to the environment upon discarding. The inventors have also discovered a method for preparing more excellent modified plywood or modified laminated veneer lumber by simultaneously applying the same reagent to a cut section or machined section of plywood or laminated veneer lumber as well.

Furthermore, the inventors have discovered that by adding the above-described aqueous water repellent to wooden fibers and heat compression molding them, a wooden fiberboard is improved in both water resistance and strength performance. The present invention is predicated on these discoveries.

Accordingly, in a first aspect, the invention provides an aqueous water repellent for the treatment of a substrate, comprising the product of co-hydrolytic condensation of (A) 100 parts by weight of an organosilicon compound having the following general formula (1):

$$(R^1)_a(OR^2)_b SiO_{(4-a-b)/2} \qquad (1)$$

wherein $R^1$ is an alkyl group having 1 to 6 carbon atoms, $R^2$ is an alkyl group having 1 to 4 carbon atoms, letter a is a positive number of 0.75 to 1.5, b is a positive number of 0.2 to 3 and a+b is from more than 0.9 to 4, and (B) 0.5 to 49 parts by weight of an amino group-containing alkoxysilane having the following general formula (2):

$$R^3R^4NR^5—SiR^6_n(OR^2)_{3-n} \qquad (2)$$

wherein $R^2$ is as defined above, $R^3$ and $R^4$ each are independently hydrogen or an alkyl or aminoalkyl group having 1 to 15 carbon atoms, $R^5$ is a divalent hydrocarbon group having 1 to 18 carbon atoms, $R^6$ is an alkyl group having 1 to 4 carbon atoms, and n is 0 or 1, or a partial hydrolyzate thereof, the co-hydrolytic condensation being effected in the presence of an organic acid or inorganic acid; and a method for preparing an aqueous water repellent for the treatment of a substrate, comprising effecting co-hydrolytic condensation of the above-defined components (A) and (B) in the above-specified amounts in the presence of an organic acid or inorganic acid. In this embodiment, an aliphatic quaternary ammonium compound and/or a boron-containing compound is preferably added to the water repellent.

In another aspect, the invention provides a method for preparing a modified plywood or a modified laminated veneer lumber, comprising the step of impregnating a plywood or a laminated veneer lumber with the aqueous water repellent from its front and back surfaces, for causing the water repellent to selectively penetrate into wood inter- and intracellular spaces in regions of the plywood or the laminated veneer lumber between the front and back surfaces and first adhesive layers disposed closest to the front and back surfaces. In this embodiment, the plywood or the laminated veneer lumber has a cut or machined section, and the same water repellent as used herein is preferably applied to the cut or machined section of the plywood or the laminated veneer lumber for impregnation.

In a further aspect, the invention provides a method for preparing a wooden fiberboard, comprising the step of heat compression molding a sheet-shaped member of wooden fibers having the aqueous water repellent added thereto, using an adhesive; and a method for preparing a wooden fiberboard, comprising the step of heat compression molding a sheet-shaped member of wood fibers, using an adhesive having the aqueous water repellent added thereto.

BRIEF DESCRIPTION OF THE DRAWINGS

FIG. 2 is a cross-sectional view of a plywood or a laminated veneer lumber having applied to its cut or machined sections an aqueous water repellent according to the invention.

BEST MODE FOR CARRYING OUT THE INVENTION

Figure 1:
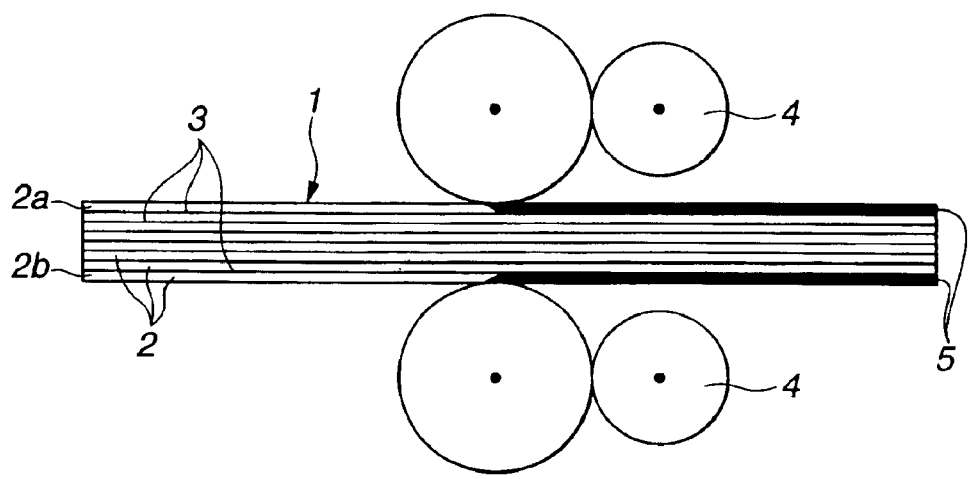
FIG. 1 is a cross-sectional view of a plywood or a laminated veneer lumber impregnated from its front and back surfaces with an aqueous water repellent according to the invention.
Figure 2A:
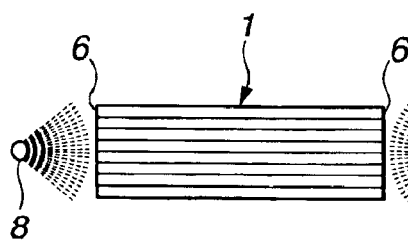
FIG. 2A illustrating application of the water repellent to end surfaces.
Figure 2B:
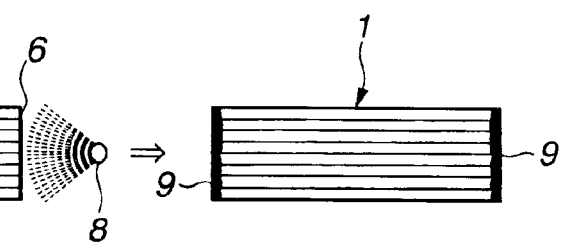
FIG. 2B illustrating impregnation with the water repellent from end surfaces.
Figure 2C:
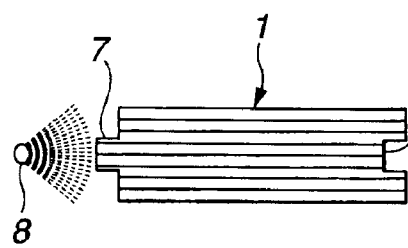
FIG. 2C illustrating application of the water repellent to machined surfaces.
Figure 2D:
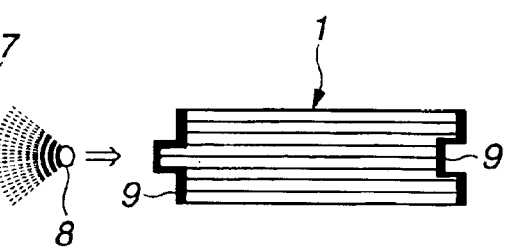
FIG. 2D illustrating impregnation with the water repellent from end surfaces.

Now the present invention is described in more detail.

Component (A) used to produce the aqueous water repellent for the treatment of substrates according to the invention is an organosilicon compound having the following general formula (1).

$$(R^1)_a(OR^2)_b SiO_{(4-a-b)/2} \quad (1)$$

Herein $R^1$ is an alkyl group having 1 to 6 carbon atoms, $R^2$ is an alkyl group having 1 to 4 carbon atoms, letter a is a positive number of 0.75 to 1.5, b is a positive number of 0.2 to 3 and a+b is from more than 0.9 to 4.

More particularly, in formula (1), $R^1$ is an alkyl group having 1 to 6 carbon atoms, preferably 1 to 3 carbon atoms. Examples include methyl, ethyl, n-propyl, isopropyl, n-butyl, isobutyl, n-pentyl and n-hexyl, with methyl being preferred.

$R^2$ is an alkyl group having 1 to 4 carbon atoms, for example, methyl, ethyl, n-propyl, isopropyl, n-butyl and isobutyl, with methyl and ethyl being preferred.

Illustrative examples of the organosilicon compound of formula (1) are given below.

| | |
|---|---|
| CH$_3$Si(OCH$_3$)$_3$, | CH$_3$Si(OC$_2$H$_5$)$_3$, |
| CH$_3$Si(OCH(CH$_3$)$_2$)$_3$, | CH$_3$CH$_2$Si(OCH$_3$)$_3$, |
| CH$_3$CH$_2$Si(OC$_2$H$_5$)$_3$, | CH$_3$CH$_2$Si(OCH(CH$_3$)$_2$)$_3$, |
| C$_3$H$_6$Si(OCH$_3$)$_3$, | C$_3$H$_6$Si(OC$_2$H$_5$)$_3$, |
| C$_3$H$_6$Si(OCH(CH$_3$)$_2$)$_3$, | C$_4$H$_9$Si(OCH$_3$)$_3$, |
| C$_4$H$_9$Si(OC$_2$H$_5$)$_3$, | C$_4$H$_9$Si(OCH(CH$_3$)$_2$)$_3$, |
| C$_5$H$_{11}$Si(OCH$_3$)$_3$, | C$_5$H$_{11}$Si(OC$_2$H$_5$)$_3$, |
| C$_5$H$_{11}$Si(OCH(CH$_3$)$_2$)$_3$, | C$_6$H$_{13}$Si(OCH$_3$)$_3$, |
| C$_6$H$_{13}$Si(OC$_2$H$_5$)$_3$, | C$_6$H$_{13}$Si(OCH(CH$_3$)$_2$)$_3$ |

These silanes may be used alone or in admixture of any. Partial hydrolyzates of mixed silanes are also useful.

Herein, alkoxy group-containing siloxanes resulting from partial hydrolytic condensation of the above silanes are preferably used as component (A). The partial hydrolyzates (siloxane oligomers) preferably have 2 to 10 silicon atoms, especially 2 to 4 silicon atoms. The reaction products of alkyltrichlorosilanes having 1 to 6 carbon atoms with methanol or ethanol in water may also be used as component (A). In this case too, the siloxane oligomers preferably have 2 to 6 silicon atoms, especially 2 to 4 silicon atoms. Of these siloxane oligomers, siloxane dimers of the formula [CH$_3$(OR$^2$)$_2$Si]$_2$O are especially preferred. They may contain siloxane trimers and siloxane tetramers. The preferred siloxane oligomers are those having a viscosity of up to 300 mm$^2$/s at 25° C., especially 1 to 100 mm$^2$/s at 25° C.

Component (B) is an amino group-containing alkoxysilane having the following general formula (2) or a partial hydrolyzate thereof.

$$R^3R^4NR^5\text{—}SiR^6{}_n(OR^2)_{3-n} \quad (2)$$

Herein $R^2$ is as defined above, $R^3$ and $R^4$, which may be the same or different, are independently hydrogen or an alkyl or aminoalkyl group having 1 to 15 carbon atoms, preferably 1 to 8 carbon atoms, more preferably 1 to 4 carbon atoms, $R^5$ is a divalent hydrocarbon group having 1 to 18 carbon atoms, preferably 1 to 8 carbon atoms, more preferably 3 carbon atoms, $R^6$ is an alkyl group having 1 to 4 carbon atoms, and n is 0 or 1.

In formula (2), examples of $R^3$ and $R^4$ include methyl, ethyl, propyl, butyl, aminomethyl, aminoethyl, aminopropyl and aminobutyl. Examples of $R^5$ include alkylene groups such as methylene, ethylene, propylene and butylene. Exemplary of $R^6$ are methyl, ethyl, propyl and butyl.

Illustrative examples of the amino group-containing alkoxysilane of formula (2) are given below.

| |
|---|
| H$_2$N(CH$_2$)$_2$Si(OCH$_3$)$_3$, |
| H$_2$N(CH$_2$)$_2$Si(OCH$_2$CH$_3$)$_3$, |
| H$_2$N(CH$_2$)$_3$Si(OCH$_3$)$_3$, |
| H$_2$N(CH$_2$)$_3$Si(OCH$_2$CH$_3$)$_3$, |
| CH$_3$NH(CH$_2$)$_3$Si(OCH$_3$)$_3$, |
| CH$_3$NH(CH$_2$)$_3$Si(OCH$_2$CH$_3$)$_3$, |
| CH$_3$NH(CH$_2$)$_5$Si(OCH$_3$)$_3$, |
| CH$_3$NH(CH$_2$)$_5$Si(OCH$_2$CH$_3$)$_3$, |
| H$_2$N(CH$_2$)$_2$NH(CH$_2$)$_3$Si(OCH$_3$)$_3$, |
| H$_2$N(CH$_2$)$_2$NH(CH$_2$)$_3$Si(OCH$_2$CH$_3$)$_3$, |
| CH$_3$NH(CH$_2$)$_2$NH(CH$_2$)$_3$Si(OCH$_3$)$_3$, |
| CH$_3$NH(CH$_2$)$_2$NH(CH$_2$)$_3$Si(OCH$_2$CH$_3$)$_3$, |
| C$_4$H$_9$NH(CH$_2$)$_2$NH(CH$_2$)$_3$Si(OCH$_3$)$_3$, |
| C$_4$H$_9$NH(CH$_2$)$_2$NH(CH$_2$)$_3$Si(OCH$_2$CH$_3$)$_3$, |
| H$_2$N(CH$_2$)$_2$SiCH$_3$(OCH$_3$)$_2$, |
| H$_2$N(CH$_2$)$_2$SiCH$_3$(OCH$_2$CH$_3$)$_2$, |
| H$_2$N(CH$_2$)$_3$SiCH$_3$(OCH$_3$)$_2$, |
| H$_2$N(CH$_2$)$_3$SiCH$_3$(OCH$_2$CH$_3$)$_2$, |
| CH$_3$NH(CH$_2$)$_3$SiCH$_3$(OCH$_3$)$_2$, |
| CH$_3$NH(CH$_2$)$_3$SiCH$_3$(OCH$_2$CH$_3$)$_2$, |
| CH$_3$NH(CH$_2$)$_5$SiCH$_3$(OCH$_3$)$_2$, |
| CH$_3$NH(CH$_2$)$_5$SiCH$_3$(OCH$_2$CH$_3$)$_2$, |
| H$_2$N(CH$_2$)$_2$NH(CH$_2$)$_3$SiCH$_3$(OCH$_3$)$_2$, |
| H$_2$N(CH$_2$)$_2$NH(CH$_2$)$_3$SiCH$_3$(OCH$_2$CH$_3$)$_2$, |
| CH$_3$NH(CH$_2$)$_2$NH(CH$_2$)$_3$SiCH$_3$(OCH$_3$)$_2$, |
| CH$_3$NH(CH$_2$)$_2$NH(CH$_2$)$_3$SiCH$_3$(OCH$_2$CH$_3$)$_2$, |
| C$_4$H$_9$NH(CH$_2$)$_2$NH(CH$_2$)$_3$SiCH$_3$(OCH$_3$)$_2$, |
| C$_4$H$_9$NH(CH$_2$)$_2$NH(CH$_2$)$_3$SiCH$_3$(OCH$_2$CH$_3$)$_2$ |

Of these, preferred are N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, N-(2-aminoethyl)-3-aminopropylmethyldiethoxysilane, 3-aminopropyltrimethoxysilane, 3-aminopropylmethyldimethoxysilane, 3-aminopropyltriethoxysilane, and 3-aminopropylmethyldiethoxysilane.

With respect to the mixing proportion of components (A) and (B), 0.5 to 49 parts, preferably 5 to 30 parts by weight of component (B) is used per 100 parts by weight of component (A) (all parts being by weight, hereinafter). With less than 0.5 part of component (B), the product becomes less water soluble and unstable in aqueous solution form. The product using more than 49 parts of component (B) may become poor in water repellency and long-term inhibition of water absorption and cause considerable yellowing when substrates are treated therewith.

Stated on a molar basis, components (A) and (B) are used such that 0.01 to 0.3 mol, especially 0.05 to 0.2 mol of Si atoms in component (B) are available per mol of Si atoms in component (A).

In preparing the aqueous water repellent using components (A) and (B), co-hydrolysis is carried out on components (A) and (B) in the presence of an organic acid or inorganic acid.

In a preferred embodiment, the co-hydrolytic condensation product is obtained by first hydrolyzing component (A) in the presence of an organic acid or inorganic acid, mixing the resulting hydrolyzate with component (B), and effecting further hydrolysis in the presence of an organic acid or inorganic acid.

The organic acid or inorganic acid used for the first hydrolysis of component (A) is at least one acid selected from among hydrochloric acid, sulfuric acid, methanesulfonic acid, formic acid, acetic acid, propionic acid, citric acid, oxalic acid and maleic acid. Of these, acetic acid and propionic acid are preferred. The acid is preferably used in an amount of 2 to 40 parts, more preferably 3 to 15 parts per 100 parts of component (A).

Hydrolysis is preferably carried out in a state diluted moderately with a solvent. The solvent is preferably selected from alcoholic solvents, especially methanol, ethanol, isopropyl alcohol and tert-butyl alcohol. An appropriate amount of the solvent used is 50 to 300 parts, more preferably 70 to 200 parts per 100 parts of component (A). With less than 50 parts of the solvent, excessive condensation may take place. With more than 300 parts of the solvent, hydrolysis may take a longer time.

The amount of water added to component (A) for hydrolysis is preferably 0.5 to 4 mol, especially 1 to 3 mol per mol of component (A). If the amount of water added is less than 0.5 mol, there may be left more alkoxy groups. With more than 4 mol of water, excessive condensation may take place. Preferred reaction conditions for hydrolysis of component (A) include a reaction temperature of 10 to 40° C., especially 20 to 30° C. and a reaction time of 1 to 3 hours.

The hydrolyzate of component (A) thus obtained is then reacted with component (B). Preferred reaction conditions of this step include a reaction temperature of 60 to 100° C. and a reaction time of 1 to 3 hours. At the end of reaction, the reaction system is heated above the boiling point of the solvent for distilling off the alcohol solvent. Preferably the alcohol solvent is distilled off until the content of entire alcohols (including the alcohol as reaction medium and the alcohol as by-product) in the system becomes 30% by weight or less, especially 10% by weight or less. If the product contains much alcohol, it may become white turbid or gel when diluted with water, and lose storage stability. The reaction product obtained by the above-described method should preferably have a viscosity of 5 to 2,000 mm$^2$/s at 25° C., especially 50 to 500 mm$^2$/s at 25° C. Too high a viscosity may adversely affect ease of working and storage stability and reduce the solubility in water. The product preferably has a weight average molecular weight in the range of 500 to 5,000, especially 800 to 2,000.

The aqueous water repellent of the invention is comprised of the co-hydrolytic condensation reaction product of components (A) and (B) obtained by the above-described method. Presumably because the product is present dissolved or in micelle state in an aqueous solution due to compliant orientation of hydrophilic moieties (amino and silanol groups) and hydrophobic moieties (alkylsilyl groups), the product develops water solubility despite the low content of component (B). The product exhibits good water repellency regardless of the long chain alkylsilane component being eliminated, good penetrability, and durable water repellency presumably because of orientation with respect to the substrate. When the repellent is applied to building materials such as brick, minimal volatilization on the surface prevents the surface from water wetting, staining and popup by frosting. When the repellent is diluted with water, polymerization reaction in water is restrained, and storage stability is improved.

In a preferred embodiment, (C) an aliphatic quaternary ammonium compound and/or (D) a boron-containing compound is added to the aqueous water repellent according to the invention.

Preferably the aliphatic quaternary ammonium compound (C) is a quaternary amino group-containing alkoxysilane having the following general formula (3) or a partial hydrolyzate thereof.

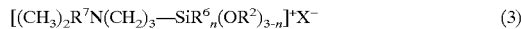

Herein R$^2$ and R$^6$ are as defined above, R$^7$ is a monovalent hydrocarbon group having 11 to 22 carbon atoms, especially alkyl or alkenyl, and n is 0 or 1. This is a component that imparts antibacterial and antifungal properties to wood when wood is treated with the aqueous water repellent.

In formula (3), exemplary of R$^7$ are —C$_{11}$H$_{23}$, —C$_{12}$H$_{25}$, —C$_{16}$H$_{31}$, —C$_{16}$H$_{33}$, —C$_{18}$H$_{37}$, —C$_{20}$H$_{41}$, and —C$_{22}$H$_{45}$ groups.

Illustrative and preferred examples of the quaternary amino group-containing alkoxysilane having formula (3) include

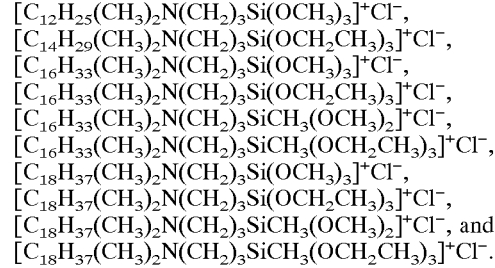

The addition of component (C) can impart antibacterial and antifungal properties. The amount of component (C) blended is preferably 0.05 to 10 parts, especially 0.1 to 5 parts by weight per 100 parts by weight of aqueous water repellent solids (co-hydrolytic condensate of components (A) and (B)). Too small amounts may impart insufficient antibacterial and antifungal properties whereas too large amounts may adversely affect the storage stability of the aqueous water repellent.

On the other hand, the boron-containing compound is preferably a boric acid compound. Examples include orthoborates such as InBO$_3$ and Mg$_3$(BO$_3$)$_2$; diborates such as Mg$_2$B$_2$O$_5$ and CO$_2$B$_2$O$_5$; metaborates such as NaBO$_2$, $KBO_2$, $LiBO_2$ and $Ca(BO_2)_2$; tetraborates such as $Na_2B_4O_7$; and pentaborates such as $KB_5O_8$. Boric acids such as orthoboric acid ($H_3BO_3$), metaboric acid ($HBO_2$) and tetraboric acid ($H_2B_4O_7$) are also useful as well as borax ($Na_2B_4O_7 \cdot 10H_2O$).

The addition of component (D) can impart termite-proof property. The amount of component (D) blended is preferably 0.1 to 10 parts, especially 2 to 8 parts by weight per 100 parts by weight of aqueous water repellent solids (co-hydrolytic condensate of components (A) and (B)). Too small amounts may impart insufficient termite-proof property whereas too large amounts may adversely affect the storage stability of the aqueous water repellent.

The aqueous water repellent of the invention is used in the treatment of substrates, especially paper, fibers, brick, and lignocellulose-originating substances such as wood for imparting water repellency. The lignocellulose-originating substances include wooden materials such as wood, plywood, laminated veneer lumber, wood particle moldings and wooden fiberboards as well as paper and fibers originating from cellulose.

Specifically, the aqueous water repellent of the invention is applicable to sheets of paper as a dimensional stabilizer. The repellent not only prevents the paper from being dimensional changes as by waving or cockling with aqueous ink (as often used in ink jet printing), but also improves the ink receptivity of the paper, offering good printed image quality. The repellent is also applicable to other substrates including various fibrous items and building materials such as brick, wood, plywood, laminated veneer lumber, and wooden fibers for fiberboards. The repellent is a useful primer for various paints and finishes as well.

When the above-mentioned substrates are treated with the aqueous water repellent of the invention, the repellent may be diluted with water to a concentration of 0.5 to 50%, preferably 1 to 10% by weight, prior to use. With thin dilution below 0.5% by weight, the repellent may fail to exert its performance to a full extent and must be applied in a larger amount, which may require a longer time for drying. A concentration of more than 50% by weight indicates insufficient dilution and gives too high a viscosity to impregnate substrates therewith, sometimes leaving coating marks and causing discoloration.

When the aqueous water repellent of the invention is diluted with water to form an aqueous solution, the aqueous solution should preferably be at pH 7 to 3, especially pH 6 to 4. If the aqueous solution is above pH 7 or alkaline, the solution can damage cellulosic substrates such as paper and wood. If the aqueous solution is below pH 3 or strongly acidic, there arise problems that substrates are damaged and equipment used for treatment are corroded. When synthesis is carried out by the above-described method, there results a co-hydrolytic condensation product falling in the above pH range. An aqueous repellent solution on a neutral to weakly acidic level is best suited when substrates are treated therewith.

Upon dilution of the aqueous water repellent of the invention with water, various subordinate additives may be added. Such additives include preservatives, antifungal agents, termite controlling agents, flavors, colorants, carboxymethyl cellulose, polyvinyl alcohol (PVA), water-soluble acrylic resins, SBR latex, and colloidal silica. Such optional component may be added in a conventional amount as long as it does not compromise the benefits of the invention.

When it is desired to cause the aqueous water repellent to penetrate deeply into the substrate, a surfactant may be added to the repellent to enhance its penetrability.

The surfactant used herein is not critical and any of well-known nonionic, cationic and anionic surfactants is useful. Examples include nonionic surfactants such as polyoxyethylene alkyl ethers, polyoxyethylene alkyl phenyl ethers, polyoxyethylene carboxylate, sorbitan fatty acid esters, polyoxyethylene sorbitan fatty acid esters, and polyether-modified silicones; cationic surfactants such as alkyltrimethylammonium chloride and alkylbenzylammonium chloride; anionic surfactants such as alkyl or alkylallyl sulfates, alkyl or alkylallyl sulfonates, and dialkyl sulfosuccinates; and ampholytic surfactants such as amino acid and betaine type surfactants. Of these, polyether-modified silicone surfactants are preferred.

An appropriate amount of the surfactant added is 0.01 to 5% by weight, more preferably 0.2 to 2.5% by weight based on the solids of the aqueous water repellent. With less than 0.01% by weight of the surfactant, the results are substantially unchanged from the results of treatment with the aqueous water repellent alone, that is, substantially no addition effect is achieved. More than 5% by weight of the surfactant may sometimes adversely affect water absorption inhibition and water repellency.

Rather than previously adding the surfactant to the aqueous water repellent, a substrate may be pretreated with a dilution of the surfactant prior to the treatment with the aqueous water repellent. In this case, the surfactant is diluted with water or an organic solvent to a concentration of 0.01 to 5%, especially 0.1 to 2% by weight, the substrate is pretreated with this surfactant dilution by roller coating, brush coating or spraying or even by dipping, and the substrate is then treated with the aqueous water repellent. This procedure ensures that the repellent penetrates deeply into the substrate.

In applying a water dilution of the aqueous water repellent to the substrate, a roller, brush, spray or the like may be used. In some cases, dipping may be used. Application may be done under atmospheric pressure or reduced pressure. The subsequent drying step may be holding at room temperature, drying in the sun, or heat drying.

The aqueous water repellent with which the substrate is impregnated in the above-described manner undergoes hydrolytic reaction and condensation reaction to form a tenacious water repellent layer. Therefore, when the repellent is applied to paper, the paper is improved in dimensional stability. When the repellent is applied to fibrous items, the fibrous items become fully water repellent. When the repellent is applied to building materials such as brick and wood, the problems of blister, corrosion and mildewing caused by water are eliminated. Additionally, the repellent serves as an underlying water-proof primer for various paints and finishes.

The aqueous water repellent of the invention is advantageously used in the preparation of modified plywood and modified laminated veneer lumber. Specifically, a plywood or a laminated veneer lumber is impregnated and treated from its front and back surfaces with the aqueous water repellent whereby the regions of the plywood or the laminated veneer lumber extending from the front and back surfaces to the first adhesive layers (usually 0.5 to 10 mm in a thickness direction) are selectively impregnated by utilizing the fact that planar adhesive layers characteristic of the plywood and the laminated veneer lumber prevent the solution from easily penetrating beyond the adhesive layers when the solution is applied to the front and back surfaces. In this way, the desired performance is obtained while reducing the amount of repellent impregnated per product volume. In the process, the same solution is preferably applied to cut sections and/or machined sections of the plywood or the laminated veneer lumber for impregnation as well.

More particularly, the tree species of wooden raw material from which the plywood or the laminated veneer lumber is made is not critical, and the type of adhesive resin used in the preparation of plywood and/or laminated veneer lumber is not critical.

When the aqueous water repellent is applied to front and back surfaces and cut sections or machined sections of plywood or laminated veneer lumber for impregnation, the temperature of plywood or laminated veneer lumber may be room temperature. However, it is desired that a temperature on the order of 40 to 80° C. be maintained not only on the surfaces, but also in the interior of plywood or laminated veneer lumber in order to ensure penetration. Inversely, the aqueous water repellent heated at a temperature of 40 to 80° C. may be used while keeping the plywood or the laminated veneer lumber at room temperature. Since the water content of plywood or laminated veneer lumber must fall in the range clearing a level of up to 14% as prescribed by the Japanese Agricultural and Forestry Standards, the aqueous water repellent is applied in such amounts as to provide a water content within that range.

It is noted that when the aqueous water repellent is applied to both front and back surfaces of plywood and/or laminated veneer lumber in a manufacturing line, with the amount of evaporation by heat taken into account, the preferable process involves the step of previously admixing 10 to 100 parts of water per 1 part of the co-hydrolytic condensate of components (A) and (B) in the coating solution or the step of applying water to both front and back surfaces of plywood or laminated veneer lumber immediately before the application of the aqueous water repellent. In the latter case, the amount of water applied may be adjusted so that 10 to 100 parts of water is available per 1 part of the co-hydrolytic condensate of components (A) and (B).

Next, the coating weight and coating technique are described. In the case of front surface coating, the coating weight is such that 0.1 to 20 g, preferably 1 to 5 g of the co-hydrolytic condensate of components (A) and (B) is coated and impregnated per square meter surface area and per millimeter of the distance from the front surface to the first adhesive layer. The same applies in the case of back surface coating. In the case of coating on a cut or machined section, the coating weight is such that 0.1 to 20 g, preferably 1 to 5 g of the co-hydrolytic condensate of components (A) and (B) is coated and impregnated per square meter cross-sectional area and per millimeter over a distance of 1 to 5 mm from the sectional surface.

With respect to the coating technique, coating by means of a roll coater or sponge roll is desired in a sense of managing the coating weight while spray coating and coating by vat immersion are also acceptable. To increase the immersion amount, the coating step may be repeated two or more times.

FIG. 1 illustrates front and back impregnated regions of a plywood or a laminated veneer lumber. A laminated veneer lumber designated at 1 includes a plurality of veneers 2 laminated via adhesive layers 3. A coating apparatus such as a roll coater is designated at 4. By the coating apparatus 4, the aqueous water repellent is selectively applied to front and back veneers 2a and 2b for impregnation to form impregnated layers 5.

FIG. 2 illustrates water repellent-impregnated regions at end faces or machined sections of a plywood or a laminated veneer lumber. The aqueous water repellent is coated to end faces 6 or machined sections 7 by coating means 8 such as sprays as shown in FIGS. 2A and 2C, thereby forming impregnated regions 9 as shown in FIGS. 2B and 2D.

Referring to aging for gelation, the aqueous water repellent of the invention generally requires 12 to 200 hours for aging for gelation after coating. Aging is desirably conducted at an air temperature of 10 to 35° C. in fully ventilated conditions.

The preparation method described above ensures that the plywood or the laminated veneer lumber which is termite-proof, rot-proof, mildew-proof, water resistant, moisture resistant and dimensional stable so that it may be used as main structural members or building interior members be easily prepared without detracting from the texture inherent to wood and without incurring blocking due to deposition.

Furthermore, the aqueous water repellent of the invention is advantageously used in the preparation of wooden fiberboards. In one embodiment, the method for the preparation of a wooden fiberboard involves adding the water repellent to wooden fibers, then adding an adhesive, and then heat compression molding a sheet-shaped member. The amount of the water repellent added in this embodiment is preferably 0.04 to 10 g per 100 g of the oven-dry wooden fiber weight. Alternatively, a wooden fiberboard can be prepared by heat compression molding a sheet-shaped member of wooden fibers while using an adhesive having the water repellent added thereto. The amount of the water repellent added in the alternative embodiment is preferably 0.04 to 30 g per 100 g of the oven-dry wooden fiber weight.

More particularly, the method for the preparation of a wooden fiberboard involves heat compression molding a sheet-shaped member of wooden fibers. The sheet-shaped member of wooden fibers is formed by fibrillating wood into fibers or filaments, and paper-machining them into a sheet or plate-shaped member by a wet or dry process. Fibrillation may be carried out by various prior art well-known techniques such as use of a grinder, use of a disk refiner or attrition mill, and explosion. The subsequent step of applying the aqueous water repellent to wooden fibers may be conducted by applying within each of the fibrillating machines or after exiting from each of the fibrillating machines. The applying technique may use a sprayer or dropping apparatus if feasible for a certain fibrillating machine. Alternatively, a necessary amount of the aqueous water repellent may be added to the adhesive to be admitted, prior to heat compression molding. It is noted that the paper-machining technique may be either a wet felting or air felting technique.

The heat compression molding step is the step of heating and pressing a sheet-shaped member of wooden fibers obtained by paper-machining to form a plate-shaped member. The heat compression molding techniques used herein include a wet pressing technique of hot pressing a wet sheet (resulting from the wet felting technique) by a multi-stage hot press, a wet forming/dry pressing technique of drying the wet sheet followed by hot pressing, a dry pressing technique of hot pressing a dry sheet (resulting from the air felting technique) by a multi-stage hot press, and a semi-dry pressing technique of hot pressing a semi-dry sheet. In the method for the preparation of a wooden fiberboard according to the invention, the steps taken until the heat compression molding of a sheet-shaped member of wooden fibers to form a plate-shaped member of wooden fibers (referred to as fiberboard, hereinafter) may be similar to those used in the prior art method for the preparation of a wooden fiberboard, unless otherwise stated. The fiberboards are those of any type including insulation boards (IB) and hard boards (HB), though they are preferably medium density fiberboards (MDF).

Then, in the method for the preparation of a wooden fiberboard according to the invention, the amount of the aqueous water repellent added is generally 0.04 to 10 g, preferably 0.2 to 7 g, and more preferably 0.5 to 2 g per 100 g of the oven-dry wooden fibers. If the addition amount is less than 0.04 g, a wooden fiberboard as heat compression molded is often insufficiently improved in water resistance. An addition amount in excess of 10 g has an inconvenient likelihood that wooden fibers are curled, subsequent uniform application of the adhesive to wooden fibers is affected thereby, a sheet-shaped member having a uniform density distribution is not obtainable, and a decline of water resistance improving effect and even a decline of strength performance are incurred.

On the other hand, the amount of the water repellent added to the adhesive is generally 0.04 to 30 g, preferably 5 to 25 g, and more preferably 15 to 20 g per 100 g of the oven-dry wooden fibers. If the addition amount is less than 0.04 g, a wooden fiberboard as heat compression molded is often insufficiently improved in water resistance. An addition amount in excess of 30 g indicates a too much proportion of the weight of the water repellent (inclusive of the adhesive) relative to the wooden fibers, leading to an inconvenient likelihood that it becomes a factor of interfering with the adhesive's own adhesive force, and as previously mentioned, a sheet-shaped member having a uniform density distribution is obtainable with difficulty, and a decline of water resistance improving effect and even a decline of strength performance are incurred. Also the cost increases.

EXAMPLE

Examples of the invention are given below together with Comparative Examples by way of illustration and not by way of limitation. All parts are by weight.

Example 1

A 500-ml four-necked flask equipped with a condenser, thermometer and dropping funnel was charged with 85 g (0.37 mol calculated as dimer) of a methyltrimethoxysilane oligomer, 154 g of methanol and 5.1 g of acetic acid. With stirring, 6.8 g (0.37 mol) of water was added to the charge, which was stirred for 2 hours at 25° C. Then 8.9 g (0.04 mol) of N-(2-aminoethyl)-3-aminopropyltrimethoxysilane was added dropwise. The reaction solution was heated to the reflux temperature of methanol and reaction effected for one hour. With an ester adapter attached, methanol was distilled off until the internal temperature reached 110° C. There was obtained 81 g of a pale yellow clear solution having a viscosity of 71 mm$^2$/s (weight average molecular weight 1100). The content of residual methanol in the solution was 5% by weight. This is designated Repellent 1.

Example 2

Reaction was carried out as in Example 1 except that the amount of N-(2-aminoethyl)-3-aminopropyltrimethoxysilane was changed to 17.8 g (0.08 mol). There was obtained 86 g of a pale yellow clear solution having a viscosity of 116 mm$^2$/s (weight average molecular weight 1200). The content of residual methanol in the solution was 5% by weight. This is designated Repellent 2.

Example 3

A 500-ml four-necked flask equipped with a condenser, thermometer and dropping funnel was charged with 50.3 g (0.37 mol) of methyltrimethoxysilane, 124 g of methanol and 5.1 g of acetic acid. With stirring, 6.8 g (0.37 mol) of water was added to the charge, which was stirred for 2 hours at 25° C. Then 8.9 g (0.04 mol) of N-(2-aminoethyl)-3-aminopropyltrimethoxysilane was added dropwise. The reaction solution was heated to the reflux temperature of methanol and reaction effected for one hour. With an ester adapter attached, methanol was distilled off until the internal temperature reached 110° C. There was obtained 43 g of a pale yellow clear solution having a viscosity of 65 mm$^2$/s (weight average molecular weight 1000). The content of residual methanol in the solution was 6% by weight. This is designated Repellent 3.

Example 4

A 500-ml four-necked flask equipped with a condenser, thermometer and dropping funnel was charged with 60.6 g (0.37 mol) of propyltrimethoxysilane, 144 g of methanol and 5.1 g of acetic acid. With stirring, 6.8 g (0.37 mol) of water was added to the charge, which was stirred for 2 hours at 25° C. Then 8.9 g (0.04 mol) of N-(2-aminoethyl)-3-aminopropyltrimethoxysilane was added dropwise. The reaction solution was heated to the reflux temperature of methanol and reaction effected for one hour. With an ester adapter attached, methanol was distilled off until the internal temperature reached 110° C. There was obtained 51 g of a pale yellow clear solution having a viscosity of 65 mm$^2$/s (weight average molecular weight 800). The content of residual methanol in the solution was 7% by weight. This is designated Repellent 4.

Example 5

Reaction was carried out as in Example 1 except that 17.7 g (0.08 mol) of 3-aminopropyltriethoxysilane was used instead of N-(2-aminoethyl)-3-aminopropyltrimethoxysilane. There was obtained 90 g of a pale yellow clear solution having a viscosity of 220 mm$^2$/s (weight average molecular weight 1300). The content of residual methanol in the solution was 5% by weight. This is designated Repellent 5.

Comparative Example 1

A 500-ml four-necked flask equipped with an aspirator and thermometer was charged with 136 g (1.0 mol) of methyltrimethoxysilane, 222.0 g (1.0 mol) of N-(2-aminoethyl)-3-aminopropyltrimethoxysilane and 43.2 g (2.4 mol) of water. With heating and stirring, stripping was carried out through the aspirator until the internal temperature reached 60° C. There was obtained a pale yellow clear solution (weight average molecular weight 900). The content of residual methanol in the solution was 1% by weight. This is designated Repellent 6.

Comparative Example 2

A mixture of 10.5 g (0.04 mol) of decyltrimethoxysilane, 8.8 g of methanol, 0.8 g of acetic acid and 2.2 g (0.12 mol) of water was stirred for one hour at 25° C., yielding a clear solution.

A 500-ml four-necked flask equipped with a condenser, thermometer and dropping funnel was charged with 85 g (0.37 mol calculated as dimer) of a methyltrimethoxysilane oligomer and 170 g of methanol. With stirring, the hydrolyzate of decyltrimethoxysilane obtained above was added dropwise to the charge, which was stirred for one hour at 25° C. Then 5.1 g of acetic acid and 6.7 g (0.37 mol) of water were added to the solution, which was stirred for a further one hour at 25° C. Then 17.8 g (0.08 mol) of N-(2-aminoethyl)-3-aminopropyltrimethoxysilane was added dropwise. The reaction solution was heated to the reflux temperature of methanol and reaction effected for one hour. With an ester adapter attached, methanol was distilled off until the internal temperature reached 110° C. There was obtained a pale yellow clear solution (weight average molecular weight 1300). The content of residual methanol in the solution was 8% by weight. This is designated Repellent 7.

Comparative Example 3

A 500-ml four-necked flask equipped with a condenser, thermometer and dropping funnel was charged with 85 g (0.37 mol calculated as dimer) of a methyltrimethoxysilane oligomer and 8.9 g (0.04 mol) of N-(2-aminoethyl)-3-aminopropyltrimethoxysilane. With stirring, 5.1 g of acetic acid was added to the charge, which was stirred for one hour at 25° C. There was obtained 98 g of a pale yellow clear solution. It was attempted to dilute 10 parts of the composition with 90 parts of water, but a gel formed immediately after dilution.

Comparative Example 4

A 500-ml four-necked flask equipped with a condenser, thermometer and dropping funnel was charged with 85 g (0.37 mol calculated as dimer) of a methyltrimethoxysilane oligomer and 8.9 g (0.04 mol) of N-(2-aminoethyl)-3-aminopropyltrimethoxysilane. With stirring, 6.8 g (0.37 mol) of water was added to the charge. Although it was attempted to stir the solution for 3 hours at 60° C., the reaction solution gelled after one hour of reaction.

Comparative Example 5

A 1-liter four-necked flask equipped with a condenser, thermometer and dropping funnel was charged with 150 g (1.1 mol) of methyltrimethoxysilane, 100 g (0.41 mol) of 3,4-epoxycyclohexylethyltrimethoxysilane, and 20 g (0.09 mol) of N-(2-aminoethyl)-3-aminopropyltrimethoxysilane. With stirring, a mixture of 100 g (5.55 mol) of water and 200 g of methanol was added dropwise to the charge over 30 minutes. The solution was stirred for a further one hour at 60° C. for reaction. There was obtained 567 g of a pale yellow clear solution. It was attempted to dilute 10 parts of the composition with 90 parts of water, but a gel formed immediately after dilution.

Example 6

A composition obtained by mixing 10 parts of Repellent 1 synthesized in Example 1 and 0.5 part of 3-(trimethoxysilyl)propyloctadecyldimethylammonium with 89.5 parts of water and dissolving therein is designated Repellent 8.

Example 7

A composition obtained by mixing 10 parts of Repellent 1 synthesized in Example 1 and 2 parts of boric acid with 88 parts of water and dissolving therein is designated Repellent 9.

Evaluation of Storage Stability

Plastic containers were charged with solutions of 10 parts of each Repellents 1 to 7 (synthesized in Examples 1–5 and Comparative Examples 1–2) diluted with 90 parts of water, and Repellents 8 and 9 (obtained in Examples 6 and 7). Storage stability was examined at room temperature and 40° C. The results are shown in Table 1.

TABLE 1

| Repellent | Appearance as prepared | Storage at RT | Storage at 40° C. |
|---|---|---|---|
| 1 | faintly turbid, clear | ≧180 days | ≧120 days |
| 2 | faintly turbid, clear | ≧180 days | ≧120 days |
| 3 | faintly turbid, clear | ≧180 days | ≧120 days |
| 4 | faintly turbid, clear | ≧180 days | ≧120 days |
| 8 | faintly turbid, clear | ≧180 days | ≧120 days |
| 9 | faintly turbid, clear | ≧180 days | ≧120 days |
| 5 | yellow, clear | ≧180 days | ≧120 days |
| 6 | faintly turbid, clear | gelled on 120th day | gelled on 80th day |
| 7 | white turbid | gelled on 14th day | gelled on 5th day |

Use Example 1

Solutions of 10 parts of Repellents 1 to 7 (obtained in Examples 1–5 or Comparative Examples 1–2) diluted with 90 parts of water were spray coated onto plain paper sheets having a weight of 70 g/m², which were passed between a pair of heating rolls for drying. It was found that the repellents had penetrated into the interior of the plain paper sheets. All the treated paper sheets (Sample Nos. 1 to 6) were smooth and bore 4.0 g/m² of siloxane (calculated on a solids basis).

Using an ink jet printer PM-750C (Seiko Epson Co., Ltd.), color images were printed on the treated paper sheets. After ink drying, the printed sheets were visually observed whether they were deformed or how the printed images were sharp. The criteria for evaluating deformation and sharpness are given below. The results are shown in Table 2.

(1) Discoloration of treated paper
○: not discolored
Δ: somewhat discolored
X: discolored
(2) Deformation of treated paper
○: no deformation or cockle
Δ: some cockles
X: marked cockles
(3) Sharpness of printed image
○: very sharp without bleeding
Δ: some bleeding
X: marked bleeding

TABLE 2

| | Repellent | Discoloration | Deformation | Sharpness |
|---|---|---|---|---|
| Examples | 1 | ○ | ○ | ○ |
| | 2 | ○ | ○ | ○ |
| | 3 | ○ | ○ | ○ |
| | 4 | ○ | ○ | ○ |
| | 5 | ○ | ○ | ○ |
| Comparative | 6 | Δ | Δ | Δ |
| Examples | 7 | X | ○ | X |

Use Example 2

Brick pieces were dipped in solutions of 5 parts of Repellents 1 to 7 (obtained in Examples 1–5 and Comparative Examples 1–2) diluted with 95 parts of water (designated Water Absorption Inhibitors 1 to 7) and aged therein, taken out and air dried for one week at room temperature, obtaining test samples. Tests were carried out on the samples by the methods described below for examining the surface state, water absorption inhibition, penetration depth and water repellency. The results are shown in Table 3.

In another run, brick pieces were dipped in solutions of 5 parts of Repellents 1 to 7 (obtained in Examples 1–5 and Comparative Examples 1–2) and 0.5 part of a polyether-modified silicone surfactant (KF640 by Shin-Etsu Chemical Co., Ltd.) diluted with 95 parts of water (designated Water Absorption Inhibitors 1' to 7') and aged therein, taken out and air dried for one week at room temperature, obtaining test samples. Tests were carried out on the samples by the methods described below for examining the surface state, water absorption inhibition, penetration depth and water repellency. The results are shown in Table 4.

In a further run, brick pieces were dipped in an aqueous solution of 0.5 part of a polyether-modified silicone surfactant (KF640 by Shin-Etsu Chemical Co., Ltd.) in 99.5 parts of water for 5 minutes as a pretreatment, then dipped in Water Absorption Inhibitors 1 to 7 and aged therein, taken out and air dried for one week at room temperature, obtaining test samples. Tests were carried out on the samples by the methods described below for examining the surface state, water absorption inhibition, penetration depth and water repellency. The results are shown in Table 5.

(a) Surface State, Water Absorption Inhibition

A brick sample of 50×50×25 mm was dipped in an aqueous solution of repellent for 30 seconds so as to give a coverage of 100 g/m² of the repellent over the entire surfaces of the sample. The sample was aged for 7 days in an atmosphere of RH 50%. The surface state of the sample was visually observed and rated according to the following criterion. Subsequently, the sample was immersed in city water for 28 days, after which a percent water absorption was calculated.

Surface state rating

○: no wetted color

X: wetted color

Water absorption (%) = [(weight of brick after water absorption) −

(weight of brick before water absorption)] /

(weight of brick before water absorption) × 100

(b) Penetration Depth

The brick sample which had been dipped and aged as in Test (a) was cut into two halves. Water was applied to the cut section so that the hardened layer was readily perceivable. The depth of penetration from the surface was measured.

(c) Water Repellency

A water droplet of 0.5 cc was dropped on the surface of the brick sample which had been dipped and aged as in Test (a), after which the state of the droplet was observed and rated according to the following criterion.

Rating

○: large contact angle (good water repellency)

Δ: moderate contact angle

X: water absorbed

TABLE 3

| Sample | Water Absorption Inhibitor | Surface state | Water absorption (wt %) | Penetration depth (mm) | Water repellency |
|---|---|---|---|---|---|
| Example | 1 | ○ | 0.5 | 10.0 | ○ |
|  | 2 | ○ | 0.8 | 9.0 | ○ |
|  | 3 | ○ | 1.0 | 8.0 | ○ |
|  | 4 | ○ | 1.2 | 7.0 | ○ |
|  | 5 | ○ | 0.5 | 11.0 | ○ |
| Comparative Example | 6 | X | 12.0 | 0.2 | X |
|  | 7 | ○ | 4.0 | 2.0 | Δ |

TABLE 4

| Sample | Water Absorption Inhibitor | Surface state | Water absorption (wt %) | Penetration depth (mm) | Water repellency |
|---|---|---|---|---|---|
| Example | 1' | ○ | 0.4 | 25.0 | ○ |
|  | 2' | ○ | 0.5 | 17.0 | ○ |
|  | 3' | ○ | 0.8 | 18.0 | ○ |
|  | 4' | ○ | 0.9 | 15.0 | ○ |
|  | 5' | ○ | 0.4 | 30.0 | ○ |
| Comparative Example | 6' | X | 10.0 | 3.0 | X |
|  | 7' | ○ | 3.5 | 2.0 | Δ |

TABLE 5

| Sample | Water Absorption Inhibitor | Surface state | Water absorption (wt %) | Penetration depth (mm) | Water repellency |
|---|---|---|---|---|---|
| Example | 1 | ○ | 0.4 | 26.0 | ○ |
|  | 2 | ○ | 0.6 | 17.0 | ○ |
|  | 3 | ○ | 0.7 | 17.0 | ○ |
|  | 4 | ○ | 0.9 | 14.0 | ○ |
|  | 5 | ○ | 0.4 | 29.0 | ○ |
| Comparative Example | 6 | X | 10.0 | 2.0 | X |
|  | 7 | ○ | 4.0 | 2.0 | Δ |

Use Example 3

Wood pieces were dipped in solutions of 2.5 parts of Repellents 1 to 7 (obtained in Examples 1–5 and Comparative Examples 1–2) diluted with 97.5 parts of water (designated Absorption Inhibitors 8 to 14) and solutions of 25 parts of Repellents 8 and 9 (obtained in Examples 6 and 7) diluted with 75 parts of water (designated Absorption Inhibitors 15 and 16) and aged therein, taken out and air dried for one week at room temperature, obtaining test samples. Tests were carried out on the samples by the methods described below for examining the surface discoloration and water absorption inhibition. The results are shown in Table 6.

In another run, wood pieces were dipped in solutions of 2.5 parts of Repellents 1 to 7 (obtained in Examples 1–5 and Comparative Examples 1–2) and 0.5 part of a polyether-modified silicone surfactant (KF640 by Shin-Etsu Chemical Co., Ltd.) diluted with 97.5 parts of water (designated Water Absorption Inhibitors 8' to 14') and aged therein, taken out and air dried for one week at room temperature, obtaining test samples. Tests were carried out on the samples by the methods described below for examining the surface discoloration and water absorption inhibition. The results are shown in Table 7.

In a further run, wood pieces were dipped in an aqueous solution of 0.5 part of a polyether-modified silicone surfactant (KF640 by Shin-Etsu Chemical Co., Ltd.) in 99.5 parts of water for 5 minutes as a pretreatment, then dipped in Water Absorption Inhibitors 8 to 14 and aged therein, taken out and air dried for one week at room temperature, obtaining test samples. Tests were carried out on the samples by the methods described below for examining the surface discoloration and water absorption inhibition. The results are shown in Table 8.

(a) Surface Discoloration, Water Absorption Inhibition

A cedar sample of 50×50×21 mm and a lauan sample of 50×50×21 mm in their entirety were dipped in an aqueous solution of repellent for 24 hours at room temperature and atmospheric pressure. The samples were aged for 7 days at room temperature. The surface of the samples was visually observed for discoloration or yellowing and rated according to the following criterion. Subsequently, the samples in their entirety were immersed in city water for 24 hours, after which a percent water absorption was calculated.

Surface discoloration

○: not discolored

Δ: slightly discolored

X: discolored

Water absorption inhibition

Water absorption (%) = [(weight of wood after water absorption) −

(weight of wood before water absorption)] /

(weight of wood before water absorption) × 100

TABLE 6

| Sample | Water absorption inhibitor | Surface discoloration Cedar | Surface discoloration Lauan | Water absorption (wt %) Cedar | Water absorption (wt %) Lauan |
|---|---|---|---|---|---|
| Example | 8 | ○ | ○ | 10 | 8 |
|  | 9 | ○ | ○ | 15 | 12 |
|  | 10 | ○ | ○ | 11 | 9 |
|  | 11 | ○ | ○ | 13 | 10 |
|  | 12 | ○ | ○ | 10 | 9 |
|  | 15 | ○ | ○ | 11 | 9 |
|  | 16 | ○ | ○ | 11 | 10 |
| Comparative Example | 13 | X | X | 47 | 45 |
|  | 14 | Δ | Δ | 33 | 26 |
|  | — (city water) | ○ | ○ | 67 | 55 |

TABLE 7

| Sample | Water absorption inhibitor | Surface discoloration Cedar | Surface discoloration Lauan | Water absorption (wt %) Cedar | Water absorption (wt %) Lauan |
|---|---|---|---|---|---|
| Example | 8' | ○ | ○ | 8 | 6 |
|  | 9' | ○ | ○ | 10 | 8 |
|  | 10' | ○ | ○ | 7 | 7 |
|  | 11' | ○ | ○ | 11 | 9 |
|  | 12' | ○ | ○ | 8 | 5 |
| Comparative Example | 13' | X | X | 37 | 33 |
|  | 14' | Δ | Δ | 23 | 19 |

TABLE 8

| Sample | Water absorption inhibitor | Surface discoloration Cedar | Surface discoloration Lauan | Water absorption (wt %) Cedar | Water absorption (wt %) Lauan |
|---|---|---|---|---|---|
| Example | 8 | ○ | ○ | 8 | 6 |
|  | 9 | ○ | ○ | 9 | 7 |
|  | 10 | ○ | ○ | 8 | 8 |
|  | 11 | ○ | ○ | 10 | 9 |
|  | 12 | ○ | ○ | 7 | 5 |
| Comparative Example | 13 | X | X | 35 | 31 |
|  | 14 | Δ | Δ | 24 | 20 |

Use Example 4

Wood pieces were immersed in solutions of 25 parts of Repellents 8 and 9 (obtained in Examples 6 and 7) diluted with 75 parts of water, aged therein, dried in air at room temperature for one week, obtaining test samples. They were subjected to a wood rotting test and a termite death test as described below. The results are shown in Table 9.

(a) Wood Rotting Test Using White and Brown Rot Fungi

For examining antibacterial/antifungal activity, a rotting test was made on inorganic matter-composited wood according to the Japan Wood Preservation Association (JWPA) Standard, No. 3 (1992), Durability Test Method for Wooden Material. After test pieces were dried and sterilized at 60° C. for 48 hours, they were placed on lawns of white rot fungus *Coriolus versicolor* (L. ex Fr.) Quel (IFO 30340) and brown rot fungus *Tyromyces palustris* (Berk. et Curk. Murr.) (IFO 303390) which had been fully grown in culture dishes in a glass container. After cultivation in an incubator at room temperature (26° C.) and a relative humidity of 55 to 65% for 8 weeks, the test pieces were taken out, and the fungal cells were wiped off form the surface. The absolute dry weight of the test pieces was determined. A percent weight loss by wood-rot fungus was calculated from the absolute dry weight of the test pieces before the test.

(b) Subterranean Rotting Test

Untreated wood test pieces and wood test pieces which had been treated with the water repellent were subjected to Soxhlet extraction with acetone and water each for 24 hours. A subterranean test of burying the test pieces in non-sterilized soil 17 cm deep from the ground surface was carried out for 9 months. A percent weight loss was calculated from the absolute dry weights of each test piece before and after the burying test, from which the progress of decay was presumed.

(c) Termite Death Test.

Two hundred (200) house termite individuals were introduced in each of containers with untreated wood pieces and water repellent-treated wood pieces and left there for 20 days, after which a termite death rate was determined.

TABLE 9

| | Sample | Wood rot with fungi (%) | | | | Wood rot by subterranean test (%) | | Termite death rate (%) | |
|---|---|---|---|---|---|---|---|---|---|
| | | Cedar | | Lauan | | | | | |
| | | White rot fungus | Brown rot fungus | White rot fungus | Brown rot fungus | Cedar | Lauan | Cedar | Lauan |
| Invention | Repellent 8 | 0.7 | 0.4 | 0.8 | 0.3 | 2.1 | 2.8 | 35 | 33 |
| | Repellent 9 | 2.2 | 1.5 | 3.1 | 2.0 | 8.9 | 7.5 | 100 | 100 |
| Comparison | — (city water) | 3.0 | 3.1 | 4.1 | 4.3 | 25.0 | 29.3 | 23 | 25 |

Example 8

The test piece used was a laminated veneer lumber prepared using Radiata pine from New Zealand as a raw material. The test piece was coated and impregnated with the water repellent before it was measured for water absorption prevention and dimensional stability.

The preparation of the laminated veneer lumber, the coating and impregnation, and the measurement of water absorption prevention and dimensional stability were conducted as follows.

Using Radiata pine veneers of 3 mm thick, a laminated veneer lumber of 9 plies having a thickness of 27 mm, a width of 300 mm and a fiber direction of 300 mm was prepared in a conventional way. It was aged for 7 days. One laminated veneer lumber was then cut into three pieces having a width of 100 mm and a fiber direction of 300 mm. The test specimens were dried in hot air blow at 105° C. for 2 hours, and then brush coated over all the surfaces (6 sides) with an aqueous solution containing 2% Repellent 1 for impregnation. The impregnated weight was 200 g/m². Then the test specimens were aged for a further 10 days, after which they were subjected to tests described below as Tests 1 and 2.

Comparative Example 6

Using Radiata pine veneers of 3 mm thick, a laminated veneer lumber of 9 plies having a thickness of 27 mm, a width of 300 mm and a fiber direction of 300 mm was prepared in a conventional way. It was aged for 7 days. One laminated veneer lumber was then cut into three pieces having a width of 100 mm and a fiber direction of 300 mm. The test specimens were dried in hot air blow at 105° C. for 2 hours and aged for a further 10 days, after which it was subjected to tests described below as Tests 1 and 2.

Test 1

Figure 3:
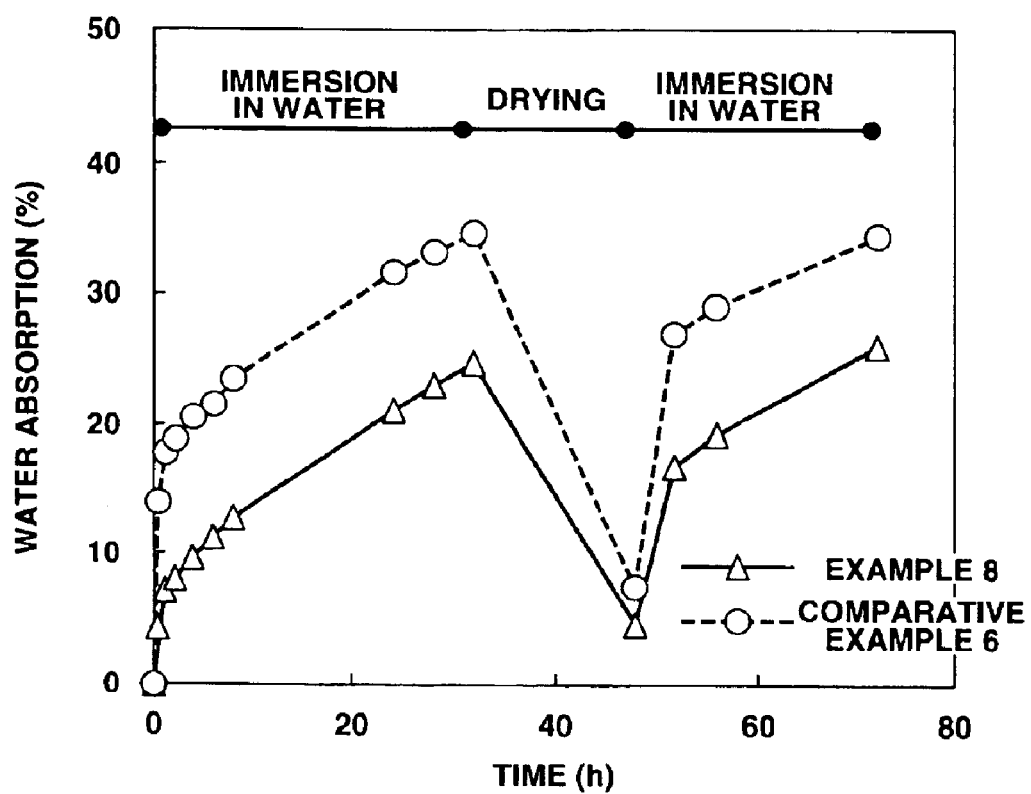
FIG. 3 is a graph showing changes with time of percent water absorption of Example 8 and Comparative Example 6 in Test 1.
Figure 4:
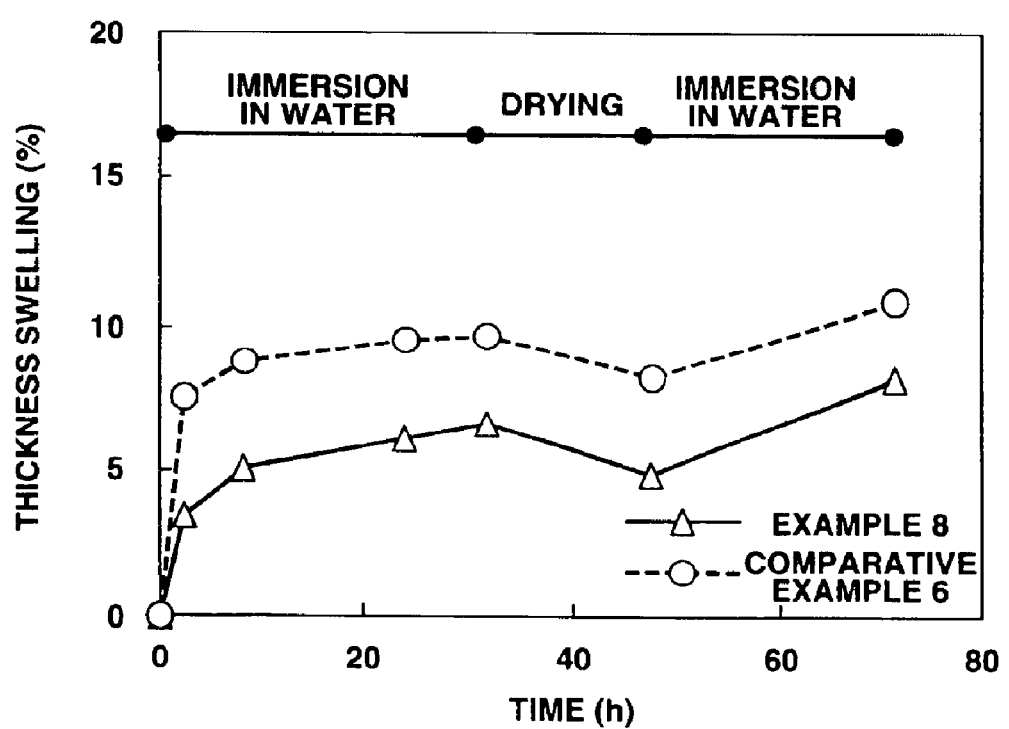
FIG. 4 is a graph showing changes with time of percent thickness swelling of Example 8 and Comparative Example 6 in Test 1.
Figure 5:
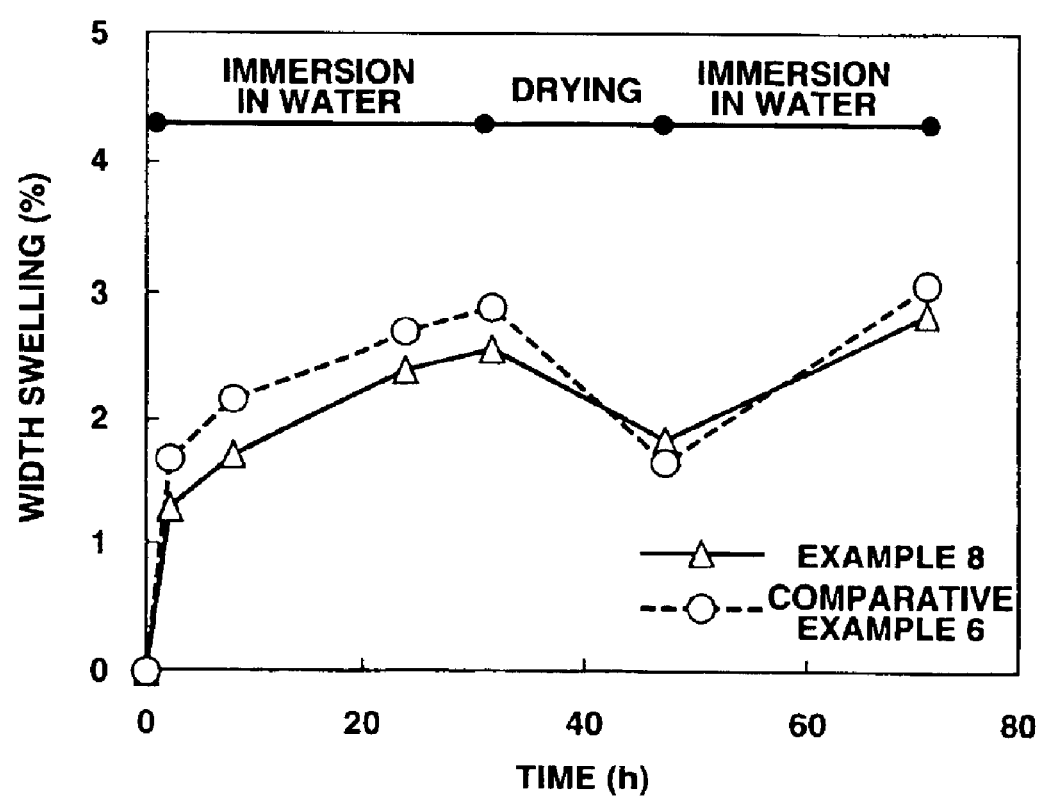
FIG. 5 is a graph showing changes with time of percent width swelling of Example 8 and Comparative Example 6 in Test 1.

The laminated veneer lumber prepared in Example 8 and Comparative Example 6 were immersed in water at room temperature for 32 hours, taken out, and dried in hot air blow at 40° C. for 16 hours. They were further immersed in water at room temperature for 24 hours. During the process, the weight, thickness and width of the test pieces were measured at suitable time intervals, from which the percent water absorption and thickness and width swelling were computed, obtaining the results shown in FIGS. 3 to 5. It is noted that the percent water absorption and thickness and width swelling were calculated according to the following equations.

Water absorption (%)=[(Wt−Wo)/Wo]×100

Wt: weight (g) of test specimen after lapse time t
Wo: weight (g) of test specimen before the test start Thickness swelling (%)=[(Tt−To)/To]×100

Tt: thickness (mm) of test specimen after lapse time t
To: thickness (mm) of test specimen before the test start Width swelling (%)=[(WIt−WIo)/WIo]×100

WIt: width (mm) of test specimen after lapse time t
WIo: width (mm) of test specimen before the test start Test 2

Figure 6:
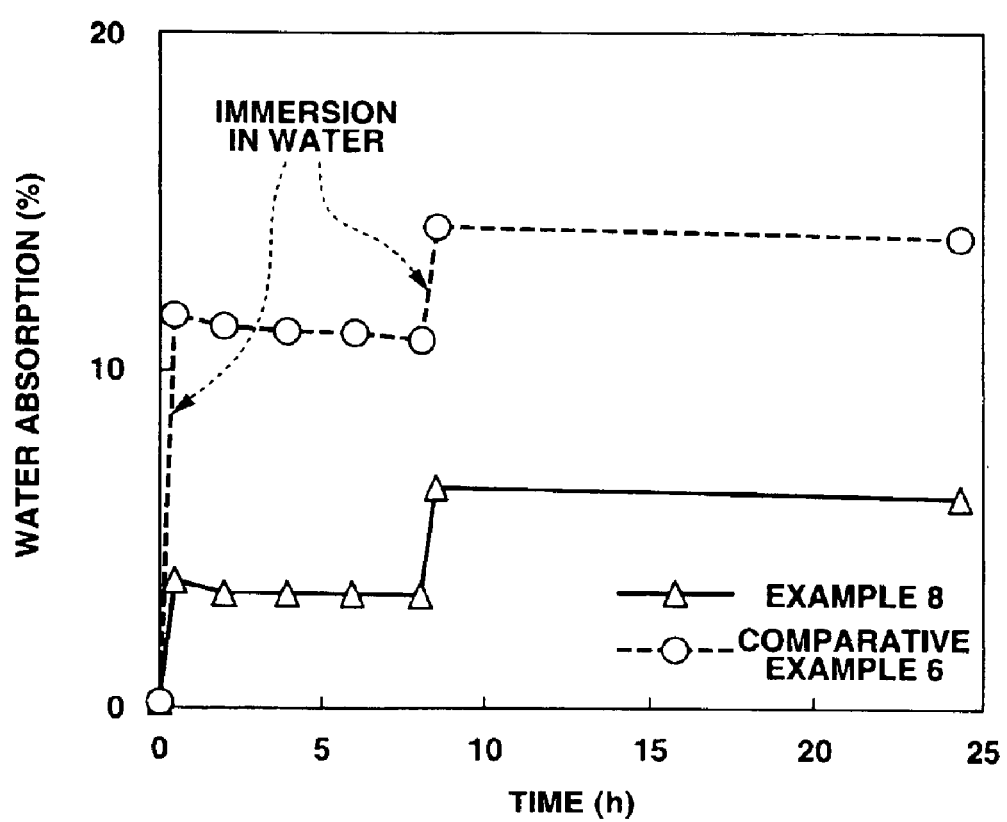
FIG. 6 is a graph showing changes with time of percent water absorption of Example 8 and Comparative Example 6 in Test 2.
Figure 7:
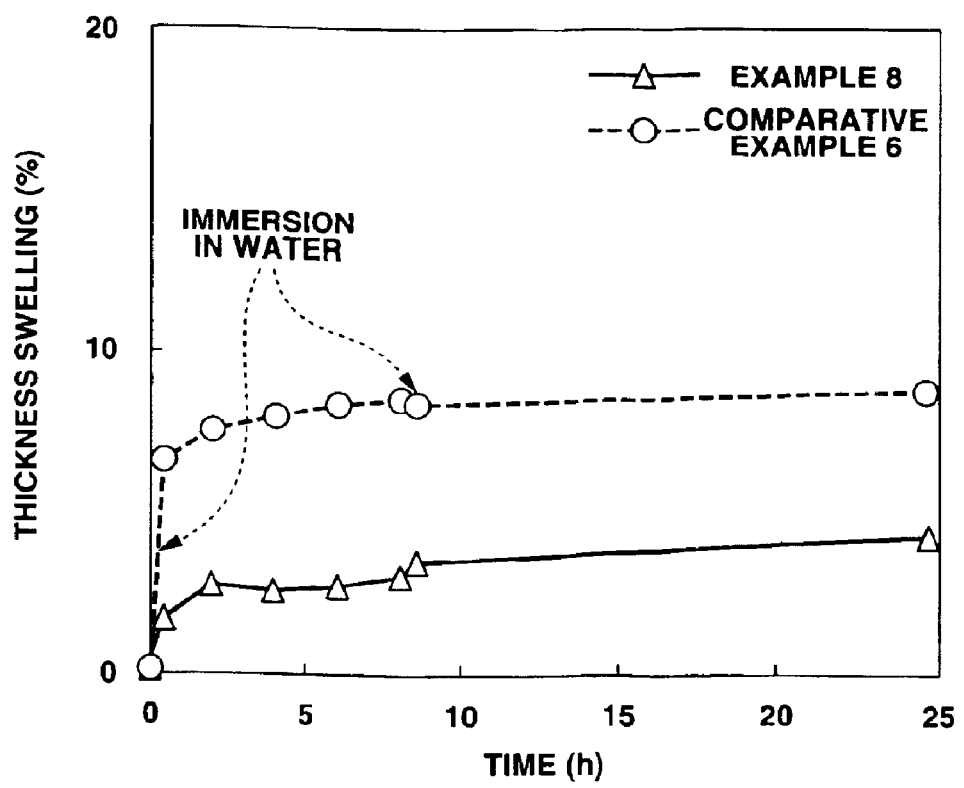
FIG. 7 is a graph showing changes with time of percent thickness swelling of Example 8 and Comparative Example 6 in Test 2.
Figure 8:
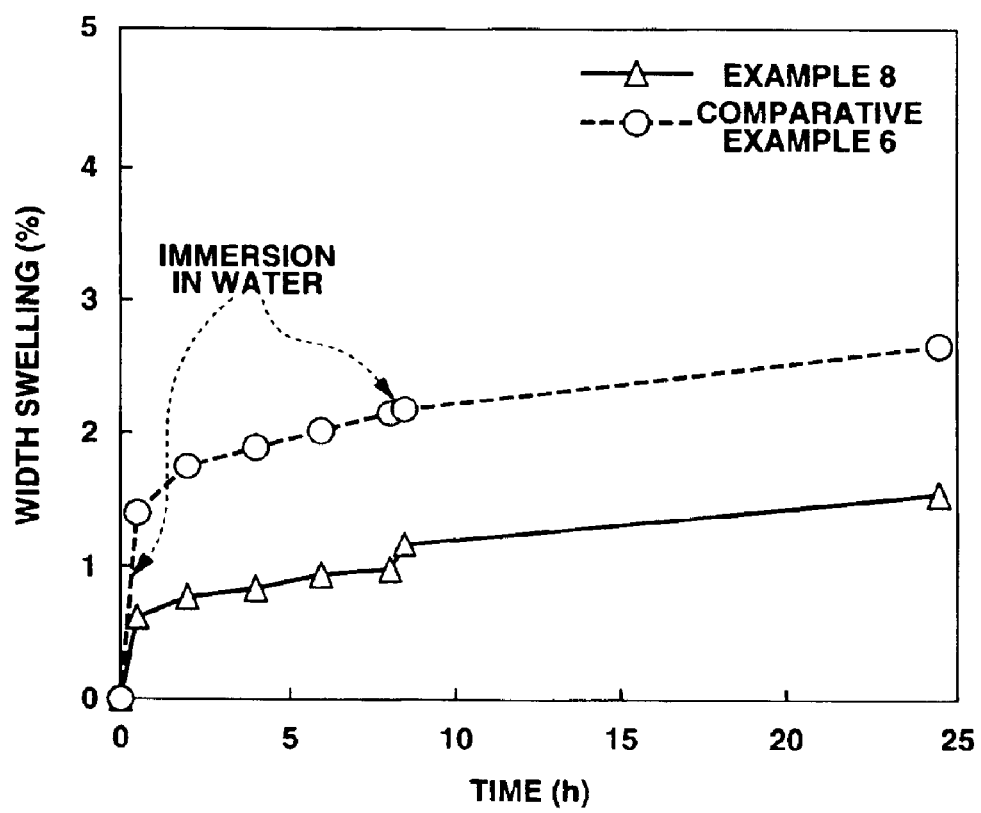
FIG. 8 is a graph showing changes with time of percent width swelling of Example 8 and Comparative Example 6 in Test 2.

The laminated veneer lumber prepared in Example 8 and Comparative Example 6 were immersed in water at room temperature for 30 minutes, taken out, and allowed to stand at room temperature for 8 hours under such conditions that water might not evaporate from within the test piece. They were further immersed in water at room temperature for 30 minutes, taken out, and allowed to stand at room temperature for 16 hours. During the process, the weight, thickness and width of the test pieces were measured at suitable time intervals, from which the percent water absorption and thickness and width swelling were computed, obtaining the results shown in FIGS. 6 to 8. The calculation equations used in computing are the same as described in Test 1.

Example 9

Figure 9:
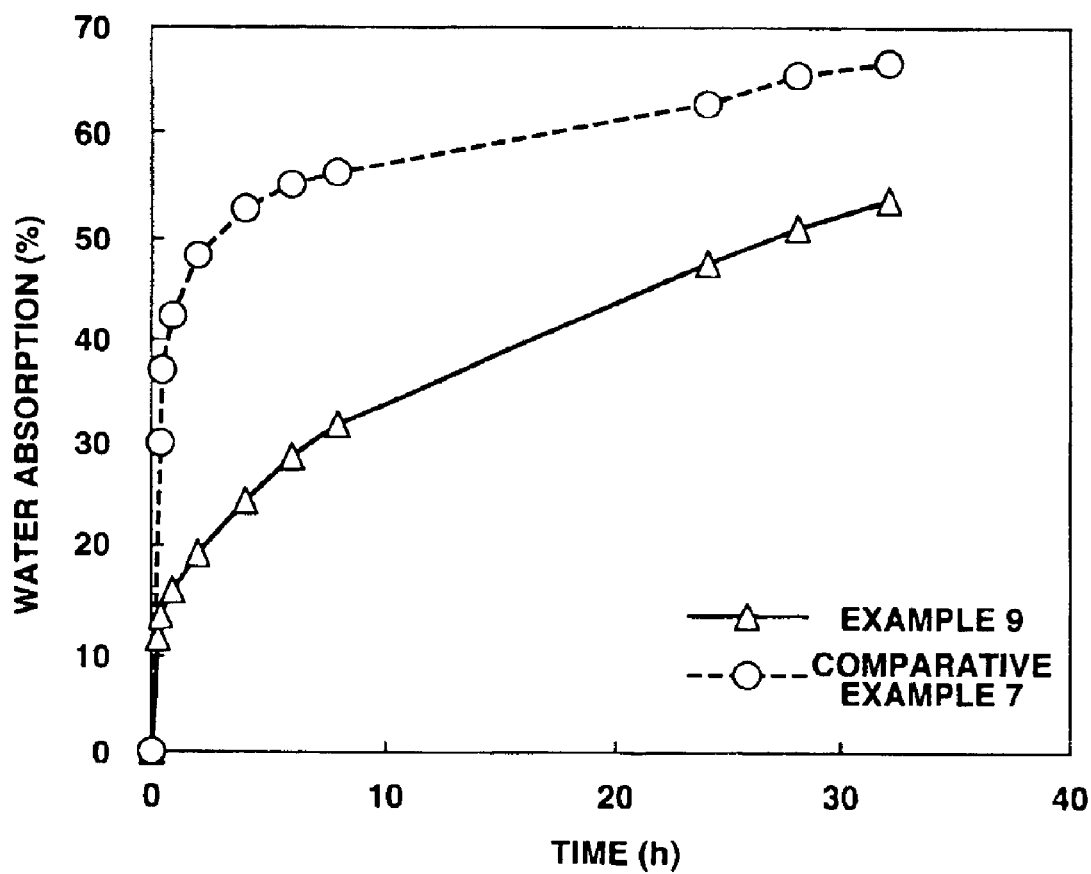
FIG. 9 is a graph showing changes with time of percent water absorption of Example 9 and Comparative Example 7.

The test specimen used was a plywood of five plies all of Radiata pine having a thickness of 12 mm (veneer construction: 1.8+3.3+1.8+3.3+1.8 mm), a width of 50 mm and a length of 50 mm. The test specimen was pre-dried in hot air blow at 120° C. for 2 hours. The weight of the test specimen was measured immediately after the pre-drying, which is the weight before the start of the test. At this point of time, an aqueous solution containing 2% Repellent 1 was applied to all surfaces of the test piece in a coating weight of 200 g/m². The test specimen was aged for 10 days, immersed in water at room temperature for 32 hours. During the process, the weight of the test specimen was measured at suitable time intervals, from which the percent water absorption was computed according to the equation shown below. The results are shown in FIG. 9.

Water absorption (%)=[(Wt−Wo)/Wo]×100

Wt: weight (g) of test specimen after lapse time t
Wo: weight (g) of test specimen before the test start Comparative Example 7

The same plywood as used in Example 9 was immersed in water at room temperature for 32 hours. During the process, the weight of the test specimen was measured at suitable time intervals, from which the percent water absorption was computed according to the same equation as used in Example 9. The results are also shown in FIG. 9.

Example 10

An aqueous solution having a predetermined concentration of Repellent 1 was spray added to the wooden fibers obtained by a continuous cooking high-pressure defibrillator, in such amounts as to provide 0.2 g, 0.5 g or 1 g of Repellent 1 per 100 g of the oven-dry wooden fiber weight, followed by drying. Thereafter, a medium density fiberboard was formed by heat compression molding the wooden fibers under conventional conditions using a versatile adhesive. After the fiberboard was aged, a specific internal bond strength, specific bending strength, specific Young's modulus in bending, thickness swelling by water absorption were computed according to the fiberboard test method of JIS A5905 and thickness swelling by a hot water test (of immersing in hot water at 70° C. for 2 hours) was computed. The results are shown in Table 10. It is noted that the specific internal bond strength, specific bending strength, and specific Young's modulus in bending are internal bond strength, bending strength, and Young's modulus in bending divided by the specific gravity of the test piece, respectively.

Comparative Example 8

A fiberboard was obtained by using the same wooden fibers as in Example 10 and adding a predetermined amount of commonly used acrylic wax instead of the above-mentioned reagent. Thereafter, performance values were computed by the same methods as in Example 10. The results are also shown in Table 10.

Example 11

Repellent 1 was admixed in an adhesive such that 10 g, 15 g or 20 g of Repellent 1 was available per 100 g of in oven-dry weight of the wooden fibers obtained by a continuous cooking high-pressure defibrillator, followed by drying. Thereafter, a medium density fiberboard was formed by heat compression molding the wooden fibers under conventional conditions. After the fiberboard was aged, a specific internal bond strength, specific bending strength, specific Young's modulus in bending, thickness swelling by water absorption were computed according to the fiberboard test method of JIS A5905 and thickness swelling by a hot water test (of immersing in hot water at 70° C. for 2 hours) was computed. The results are shown in Table 11. It is noted that the specific internal bond strength, specific bending strength, and specific Young's modulus in bending are internal bond strength, bending strength, and Young's modulus in bending divided by the specific gravity of the test specimen, respectively.

Comparative Example 9

A fiberboard was obtained by using the same wooden fibers as in Example 11 and adding a predetermined amount of commonly used acrylic wax instead of the above-mentioned reagent. Thereafter, performance values were computed by the same methods as in Example 11. The results are also shown in Table 11.

It is seen from these results that as compared with the wooden fiberboards of Comparative Examples 8 and 9, the wooden fiberboards of Examples 10 and 11 falling within the scope of the invention are improved in specific internal bond strength, specific bending strength, and specific internal bond Young's modulus in bending, despite approximately equal values of water resistance (dimensional stability).

TABLE 10

|  | Amount of reagent added per 100 g oven-dry wooden fibers (g) | Specific internal bond strength (N/mm$^2$) | Specific bending strength (N/mm$^2$) | Specific Young's modulus in bending (10$^3$ N/mm$^2$) | Thickness swelling by water absorption (%) | Thickness swelling after hot water test (%) |
|---|---|---|---|---|---|---|
| Example 10 | 0.2 | 1.36 | 82 | 7.3 | 6.1 | 28.9 |
|  | 0.5 | 1.20 | 76 | 6.9 | 5.8 | 27.5 |
|  | 1.0 | 1.06 | 70 | 6.2 | 5.1 | 27.3 |
| Comparative Example 8 | wax | 0.66 | 60 | 5.9 | 5.0 | 27.1 |

TABLE 11

|  | Amount of reagent added per 100 g oven-dry wooden fibers (g) | Specific internal bond strength (N/mm$^2$) | Specific bending strength (N/mm$^2$) | Specific Young's modulus in bending (10$^3$ N/mm$^2$) | Thickness swelling by water absorption (%) | Thickness swelling after hot water test (%) |
|---|---|---|---|---|---|---|
| Example 11 | 10 | 1.26 | 80 | 7.4 | 6.4 | 30.3 |
|  | 15 | 1.14 | 74 | 7.2 | 5.9 | 28.6 |
|  | 20 | 0.98 | 70 | 6.6 | 5.1 | 27.4 |

TABLE 11-continued

| | Amount of reagent added per 100 g oven-dry wooden fibers (g) | Specific internal bond strength (N/mm$^2$) | Specific bending strength (N/mm$^2$) | Specific Young's modulus in bending (10$^3$ N/mm$^2$) | Thickness swelling by water absorption (%) | Thickness swelling after hot water test (%) |
|---|---|---|---|---|---|---|
| Comparative Example 9 | wax | 0.71 | 62 | 6.1 | 4.9 | 26.2 |

The aqueous water repellent according to the invention has improved water solubility and storage stability, and can be used as a water repellent for neutral substrates simply after dilution with water. The neutral substrates having the repellent applied or impregnated are endowed with satisfactory water repellency and dimensional stability.

Using the aqueous water repellent mentioned above, the method for preparing modified plywood or modified laminated veneer lumber according to the invention can render plywood or laminated veneer lumber termite-proof, rot-proof, mildew-proof, water resistant, moisture resistant and dimensional stable in accordance with the desired performance at a particular service site, without compromising the porosity, low specific gravity and ease of working (machinability, nail retention, adhesion, paintability, etc.) intrinsic to wooden panels.

Further, the method for preparing wooden fiberboards according to the invention provides for process management in a manufacturing factory, which enables to carry out impregnating operation efficiently while preventing the manufacturing cost from increasing.

Additionally, the invention enables mass-scale manufacture of modified plywood and laminated veneer lumber which can be used as building structural members clearing the Japanese New Building Standards Act or as building interior members and exterior members and impose a less load to the environment upon disposal.

Moreover, the invention provides a method for preparing a wooden fiberboard wherein a wooden fiberboard having improved strength performance while maintaining water resistance performance can be manufactured at a high productivity and a low cost.

What is claimed is:

1. An aqueous water repellent for the treatment of a substrate, comprising the product of co-hydrolytic condensation of a mixture consisting of (A) 100 parts by weight of an organosilicon compound having the following general formula (1):

$$(R^1)_a(OR^2)_b SiO_{(4-a-b)/2} \quad (1)$$

wherein $R^1$ is a methyl group, $R^2$ is an alkyl group having 1 to 4 carbon atoms, letter a is a positive number of 0.75 to 1.5, b is a positive number of 0.2 to 3 and a+b is from more than 0.9 to 4, and (B) 0.5 to 49 parts by weight of an amino group-containing alkoxysilane having the following general formula (2):

$$R^3R^4NR^5-SiR^6{}_n(OR^2)_{3-n} \quad (2)$$

wherein $R^2$ is as defined above, $R^3$ and $R^4$ each are independently hydrogen or an alkyl or aminoalkyl group having 1 to 15 carbon atoms, $R^5$ is a divalent hydrocarbon group having 1 to 18 carbon atoms, $R^6$ is an alkyl group having 1 to 4 carbon atoms, and n is 0 or 1, or a partial hydrolyzate thereof, components (A) and (B) being used such that 0.01 to 0.3 mol of Si atoms in component (B) are available per mol of Si atoms in component (A), the co-hydrolytic condensation being effected in the presence of an organic acid or inorganic acid.

2. The aqueous water repellent for substrate treatment of claim 1 wherein component (A) is a siloxane oligomer.

3. The aqueous water repellent for substrate treatment of claim 2 wherein component (A) is a siloxane dimer having the formula: [CH$_3$(OR$^2$)$_2$Si]$_2$O wherein $R^2$ is as defined above.

4. The aqueous water repellent for substrate treatment of claim 1 wherein the amino group-containing alkoxysilane (B) is selected from the group consisting of H$_2$NCH$_2$CH$_2$NHCH$_2$CH$_2$CH$_2$Si(OCH$_3$)$_3$ H$_2$NCH$_2$CH$_2$NHCH$_2$CH$_2$CH$_2$Si(OCH$_2$CH$_3$)$_3$

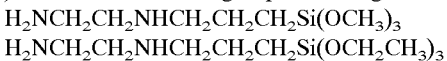

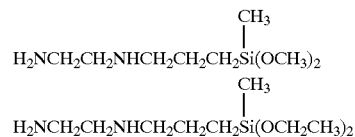

H$_2$NCH$_2$CH$_2$CH$_2$Si(OCH$_3$)$_3$

H$_2$NCH$_2$CH$_2$CH$_2$Si(OCH$_2$CH$_3$)$_3$

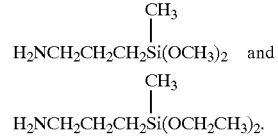

5. The aqueous water repellent for substrate treatment of claim 1 wherein the co-hydrolytic condensation product of components (A) and (B) has a weight average molecular weight of 500 to 5,000.

6. The aqueous water repellent for substrate treatment of any one of claim 1 which is obtained by hydrolyzing component (A) in the presence of an organic acid or inorganic acid and an alcohol, then reacting the resulting hydrolyzate with component (B), and removing the alcohol from the reaction system.

7. The aqueous water repellent for substrate treatment of claim 1, further comprising an aliphatic quaternary ammonium compound.

8. The aqueous water repellent for substrate treatment of claim 7 wherein the aliphatic quaternary ammonium compound is a quaternary amino group-containing alkoxysilane having the following general formula (3):

$$[(CH_3)_2R^7N(CH_2)_3-SiR^6{}_n(OR^2)_{3-n}]^+X^- \qquad (3)$$

wherein $R^2$ and $R^6$ are as defined above, $R^7$ is a monovalent hydrocarbon group having 11 to 22 carbon atoms, and n is 0 or 1, or a partial hydrolyzate thereof.

9. The aqueous water repellent for substrate treatment of claim 1, further comprising a boron-containing compound.

10. The aqueous water repellent for substrate treatment of claim 9 wherein the boron-containing compound is a boric acid.

11. The aqueous water repellent for substrate treatment of claim 1 wherein the aqueous water repellent is diluted with water before the substrate is treated therewith, the aqueous solution of the aqueous water repellent for substrate treatment being at pH 7 to 3.

12. The aqueous water repellent for substrate treatment of claim 1, further comprising a surfactant.

13. The aqueous water repellent for substrate treatment of claim 1 wherein the substrate is selected from the group consisting of paper, fibers, brick and materials originating from lignocellulose such as wood.

14. The aqueous water repellent for substrate treatment of claim 1 wherein the substrate is selected from the group consisting of paper, fibers, brick and materials originating from lignocellulose such as wood which have been pretreated with a surfactant solution.

15. The aqueous water repellent for substrate treatment of claim 13 or 14 wherein the substrate is made of a material originating from lignocellulose.

16. A method for preparing a modified plywood or modified laminated veneer lumber, comprising the step of impregnating a plywood or a laminated veneer lumber with the aqueous water repellent of claim 15 from its front and back surfaces, for causing the water repellent to selectively penetrate into wood inter- and intracellular spaces in regions of the plywood or the laminated veneer lumber between the front and back surfaces and first adhesive layers disposed closest to the front and back surfaces.

17. A method for preparing a modified plywood or a modified laminated veneer lumber according to claim 16 wherein said plywood or laminated veneer lumber has a cut or machined section, and the same water repellent as used in claim 16 is applied to the cut or machined section of said plywood or laminated veneer lumber for impregnation.

18. A method for preparing a wooden fiberboard, comprising the step of heat compression molding a sheet-shaped member of wood fibers having the aqueous water repellent of claim 15 added thereto, using an adhesive.

19. A method for preparing a wooden fiberboard, comprising the step of heat compression molding a sheet-shaped member of wood fibers, using an adhesive having the aqueous water repellent of claim 15 added thereto.

20. A method for preparing an aqueous water repellent for the treatment of a substrate, comprising the step of effecting co-hydrolytic condensation of a mixture consisting of (A) 100 parts by weight of an organosilicon compound having the following general formula (1):

$$(R^1)_a(OR^2)_bSiO_{(4-a-b)/2} \qquad (1)$$

wherein $R^1$ a methyl group, $R^2$ is an alkyl group having 1 to 4 carbon atoms, letter a is a positive number of 0.75 to 1.5, b is a positive number of 0.2 to 3 and a+b is from more than 0.9 to 4, and (B) 0.5 to 49 parts by weight of an amino group-containing alkoxysilane having the following general formula (2):

$$R^3R^4NR^5-SiR^6{}_n(OR^2)_{3-n} \qquad (2)$$

wherein $R^2$ is as defined above, $R^3$ and $R^4$ each are independently hydrogen or an alkyl or aminoalkyl group having 1 to 15 carbon atoms, $R^5$ is a divalent hydrocarbon group having 1 to 18 carbon atoms, $R^6$ is an alkyl group having 1 to 4 carbon atoms, and n is 0 or 1, or a partial hydrolyzate thereof, such that 0.01 to 0.3 mol of Si atoms in component (B) are available per mol of Si atoms in component (A), in the presence of an organic acid or inorganic acid.

21. The method of claim 20 wherein component (A) is a siloxane dimer having the formula: $[CH_3(OR^2)_2Si]_2O$ wherein $R^2$ is as defined above.

* * * * *